(12) United States Patent
Muhammad et al.

(10) Patent No.: US 12,075,505 B2
(45) Date of Patent: Aug. 27, 2024

(54) EFFICIENT BACKHAUL-LINK FAILURE RECOVERY IN INTEGRATED ACCESS BACKHAUL (IAB) NETWORKS

(71) Applicant: Telefonaktiebolaget LM Ericsson (publ), Stockholm (SE)

(72) Inventors: Ajmal Muhammad, Sollentuna (SE); Oumer Teyeb, Montreal (CA); Gunnar Mildh, Sollentuna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 407 days.

(21) Appl. No.: 17/430,524

(22) PCT Filed: Feb. 12, 2020

(86) PCT No.: PCT/EP2020/053638
§ 371 (c)(1),
(2) Date: Aug. 12, 2021

(87) PCT Pub. No.: WO2020/165275
PCT Pub. Date: Aug. 20, 2020

(65) Prior Publication Data
US 2022/0141910 A1    May 5, 2022

Related U.S. Application Data

(60) Provisional application No. 62/805,013, filed on Feb. 13, 2019.

(51) Int. Cl.
*H04W 76/19* (2018.01)
*H04L 45/28* (2022.01)
(Continued)

(52) U.S. Cl.
CPC ............. *H04W 76/19* (2018.02); *H04L 45/28* (2013.01); *H04W 40/24* (2013.01); *H04W 40/34* (2013.01);
(Continued)

(58) Field of Classification Search
CPC ..... H04W 76/19; H04W 40/24; H04W 40/34; H04W 40/22; H04W 48/16; H04W 48/20;
(Continued)

(56) References Cited

U.S. PATENT DOCUMENTS

2012/0155276 A1* 6/2012 Vasseur ................. H04W 40/24
370/237
2017/0093687 A1* 3/2017 Wu ......................... H04L 45/12
(Continued)

OTHER PUBLICATIONS

International Search Report and Written Opinion dated May 8, 2020 for International Application No. PCT/EP2020/053638 filed Feb. 12, 2020, consisting of 16-pages.
(Continued)

*Primary Examiner* — Redentor Pasia
(74) *Attorney, Agent, or Firm* — Weisberg I.P. Law, P.A.

(57) ABSTRACT

A method and network node for backhaul link failure recovery are disclosed. A network node is configured to attempt to find an alternative backhaul link to replace the failed backhaul link. If the attempt to find an alternative backhaul link fails, then the network node communicates a first indication of an existence of the failure to the first child network node one level below the network node affected by the failure and causes the first child network node to find another network node to serve as a new parent network node. If the first child network node finds another node to serve as the new parent network node then the network node is configured to serve as a second child network node of the
(Continued)

first child network node so that the first child network node serves as a parent of the network node.

18 Claims, 28 Drawing Sheets

(51) Int. Cl.
  *H04W 40/24* (2009.01)
  *H04W 40/34* (2009.01)
  *H04W 48/16* (2009.01)
  *H04W 48/20* (2009.01)
  *H04W 88/14* (2009.01)
(52) U.S. Cl.
  CPC ........... *H04W 48/16* (2013.01); *H04W 48/20* (2013.01); *H04W 88/14* (2013.01)
(58) Field of Classification Search
  CPC ... H04W 88/14; H04W 88/085; H04W 92/20; H04L 45/28; H04L 45/22
  See application file for complete search history.

(56) References Cited

U.S. PATENT DOCUMENTS

| | | | |
|---|---|---|---|
| 2020/0145860 A1* | 5/2020 | Koskela | H04W 76/14 |
| 2020/0252847 A1* | 8/2020 | Park | H04W 80/02 |
| 2021/0258244 A1* | 8/2021 | Xu | H04L 45/28 |
| 2022/0015176 A1* | 1/2022 | Ishii | H04W 76/15 |
| 2022/0038164 A1* | 2/2022 | Wei | H04W 88/14 |
| 2022/0038994 A1* | 2/2022 | Wei | H04W 40/34 |

OTHER PUBLICATIONS

3GPP TR 38.874 V0.7.0; 3rd Generation Partnership Project; Technical Specification Group Radio Access Network; Study on Integrated Access and Backhaul; (Release 15), Nov. 2018, consisting of 111-pages.
3GPP TSG RAN WG1 Ad-Hoc Meeting 1901 R1-1901264; Title: On backhaul link radio link failure handling for IAB; Agenda Item 7.2.3.6; Source: Huawei, HiSilicon; Document for: Discussion and Decision; Date and Location: Jan. 21-25, 2019, Taipei, Taiwan, consisting of 3-pages.
3GPP TSG RAN WG3 Meeting #101bis R3-185686; Title: IAB route adaptation upon RLF; Agenda Item 24.2; Source: Intel Corporation; Document for: Discussion and Decision; Date and Location: Oct. 8-12, 2018, Chengdu, China, consisting of 5-pages.
3GPP TSG-RAN WG2 #103bis R2-1815349; Title: Summary of [103# 53][IAB] E2E reliability in hop-by-hop RLC ARQ; Agenda Item 11.1.2 (NR_newRAT-Core); Source: LG Electronics Inc.; Document for: Discussion and Decision; Date and Location: Oct. 8-12, 2018, Chengdu, China, consisting of 23-pages.

* cited by examiner

EFFICIENT BACKHAUL-LINK FAILURE RECOVERY IN INTEGRATED ACCESS BACKHAUL (IAB) NETWORKS

CROSS-REFERENCE TO RELATED APPLICATIONS

This application is a Submission Under 35 U.S.C. § 371 for U.S. National Stage Patent Application of International Application No. PCT/EP2020/053638, filed Feb. 12, 2020 entitled "EFFICIENT BACKHAUL-LINK FAILURE RECOVERY IN INTEGRATED ACCESS BACKHAUL (IAB) NETWORKS," which claims priority to U.S. Provisional Application No. 62/805,013, filed Feb. 13, 2019, entitled "EFFICIENT BACKHAUL-LINK FAILURE RECOVERY IN INTEGRATED ACCESS BACKHAUL (IAB) NETWORKS the entireties of both of which are incorporated herein by reference.

FIELD

The present disclosure relates to wireless communications, and in particular, to efficient backhaul link failure recovery in Integrated Access Backhaul (IAB) networks.

BACKGROUND

Integrated Access Backhaul Networks

The Third Generation Partnership Project (3GPP) is studying potential solutions for efficient operation of integrated access and wireless access backhaul in New Radio (NR) (also known as "5G"), referred to as the Integrated Access Backhaul (IAB) network.

IAB strives to reuse existing functions and interfaces defined for access. In particular, Mobile-Termination (MT), gNode B distributed unit (gNB-DU), gNB-Central Unit (CU), User Plane Function (UPF), Access and Mobility Management Function (AMF) and Session Management Function (SMF) as well as the corresponding interfaces NR Uu (between MT and gNB), F1, NG, X2 and N4, are used as baselines for the IAB architectures. Modifications or enhancements to these functions and interfaces for the support of IAB will be explained in the context of the architecture discussion. Additional functionality such as multi-hop forwarding is included in the architecture discussion as it may be helpful for the understanding of IAB operation and since certain aspects may require standardization.

The Mobile-Termination (MT) function has been defined as a component of the Mobile Equipment. In the context of this study, MT is referred to as a function residing on an IAB-node that terminates the radio interface layers of the backhaul Uu interface toward the IAB-donor or other IAB-nodes.

FIG. 1 shows a reference diagram for IAB in standalone mode, which contains one IAB-donor 1-A, multiple IAB-nodes 1-B, 1C and user equipment 6. The IAB-donor 1-A is treated as a single logical node that includes a set of functions such as gNB-DU, gNB-CU-Control Plane (CP), gNB-CU-User Plane (UP) and potentially other functions. In a deployment, the IAB-donor 1-A can be split according to these functions, which can all be either collocated or non-collocated as allowed by 3GPP Next Generation Radio Access Network (NG-RAN) architecture. IAB-related issues may arise when such split is exercised. Also, some of the functions presently associated with the IAB-donor 1-A may eventually be moved outside of the IAB donor 1-A in case it becomes evident that they do not perform IAB-specific tasks.

Few potential architectures to implement IAB have been identified. 3GPP Technical Report (TR) 38.874 provides details of these architectures. These architectures are shown in FIGS. 2-6. After analyzing the differences between these options during the study item phase of IAB specifications, the 3GPP has considered standardized architecture 1a for technical release-16. The considered UP and CP protocol stacks are shown in FIGS. 7 and 8.

As discussed above, the chosen protocol stacks reuse the current CU-DU split specification in 3GPP release-15, where the full F1-U (General Packet Radio Service Tunneling Protocol (GTP)-U/user datagram protocol (UDP)/Internet protocol (IP)) is terminated at the IAB node (like a normal distributed unit (DU)) and the full F1-C(F1-application protocol (AP)/stream transmission control protocol (SCTP)/TP) is also terminated at the IAB node (like a normal DU). In the above cases, Network Domain Security (NDS) has been employed to protect both user plane (UP) and control plane (CP) traffic (IPsec in the case of UP, and datagram transport layer security (DTLS) in the case of CP). IPsec could also be used for the CP protection instead of DTLS.

One commonality between the CP and UP protocol stacks is that a new layer, called an adaptation layer, has been introduced in the intermediate IAB nodes and the IAB donor, which is used for routing of packets to the appropriate downstream/upstream node. The adaptation layer is also used for mapping the user equipment (UE) bearer data to the proper backhaul radio link control (RLC) channel (and also between backhaul radio link control (RLC) channels in intermediate IAB nodes) to satisfy the end to end quality of service (QoS) requirements of bearers.

Some examples of the operation of the transmitter and receiver side follow.

Packet Data Convergence Protocol (PDCP)

The PDCP entity receives PDCP service data units (SDUs) from higher layers and these SDUs are assigned a Sequence Number (SN) and delivered to lower layers (i.e., radio link control (RLC)). The discard timer is also started at the time a PDCP SDU is received. When the discard timer expires, the PDCP SDU is discarded and a discard indication is sent to lower layers. RLC, when possible, will then discard the RLC SDU.

In the receiver side, the PDCP entity starts the t-reordering when it receives packets that are out of order. When the t-reordering expires, the PDCP entity updates the variable RX_DELIV which indicates the value of the first PDCP SDU not delivered to the upper layers i.e., it indicates the lower side of the receiving window.

Radio Link Control (RLC)

In the transmitter side, when an RLC SDU is received from higher layers, a sequence number (SN) is associated to it. The transmitter may set the poll bit to request the receiver side to transmit a status report. When this is done, the t-poll Retransmit is started. Upon expiration of this timer, the transmitter will again set the poll bit and may further retransmit those packet data units (PDUs) which were waiting to be acknowledged.

The receiver, on the other hand, will start the t-reassembly when RLC PDUs are not received in sequence. The function is similar to the t-reordering in PDCP. The timer is started when there is an SN gap, i.e., an RLC PDU is missing. When t-reassembly expires, for acknowledge mode (AM), the receiver will transmit a status report to trigger a retransmission in the transmitter side.

Media Access Control (MAC)

When the UE has data to be transmitted, it will request a grant by means of the scheduling request (SR) or buffer status report (BSR).

Backhaul Link Failure

Backhaul Link Failure Recovery Scenarios

For various reasons, different scenarios of backhaul-link failure may occur in IAB networks. In the following, some example scenarios are illustrated for backhaul-link failure. Examples of such scenarios are depicted with an illustrative figure (FIGS. 9-11) aimed at establishing a route between IAB-donor and IAB-node D after back haul (BH)-link failure, where:

Nodes A1 and A2 are IAB-donor nodes; nodes B to H are IAB-nodes;

The thin dashed lines represent the established connection between two nodes;

The arrows represent the established route after BH-link failure;

the thick dashed line represents the new established connection; and the black box over a link indicates that the link has failed.

Scenario A

In this scenario (depicted in FIG. 9), the backhaul-link failure occurs between an upstream IAB-node (e.g., IAB-node C) and one of its parent IAB-nodes (e.g., IAB-node B), where the upstream IAB-node (IAB-node C) has an additional link established to another parent node (IAB-node E).

Scenario B

In this scenario (depicted in FIG. 10), the backhaul-link failure occurs between an upstream IAB-node (e.g. IAB-node C) and all its parent IAB-nodes (e.g., IAB-nodes B and E). The upstream IAB-node (IAB-node C) has to reconnect to a new parent node (e.g., IAB-node F), and the connection between IAB-node F and IAB-node C is newly established).

Scenario C

In this scenario (depicted in FIG. 11), the backhaul-link failure occurs between IAB-node C and IAB-node D. IAB-node D has to reconnect to the new IAB-donor (e.g., IAB-donor A2) via a new route.

Principal Steps of BH RLF Recovery in Architecture 1a

In the following discussion, three scenarios of backhaul RLF and subsequent recovery are discussed:

Scenario 1: Recovery via an existing BH link (FIGS. 12 and 13).

Scenario 2: Recovery via a newly established BH link using the same IAB-donor CU (FIGS. 14 and 15).

Scenario 3: Recovery via a newly established BH link using a different IAB-donor CU (FIGS. 16 and 17).

In scenario 1 (FIGS. 12 and 13), the MT on IAB-node-5 is dual-connected to IAB-node-3 and IAB-node-4, which hold the master cell group (MCG) and the secondary cell group (SCG), respectively. Two adaptation layer routes have been established, one referred to as Adapt route A via IAB-node-3, and the other referred to as Adapt route B via IAB-node 4. It is assumed that Adapt route A is used for backhauling of access traffic for the UE attached to IAB-node-5. The radio link failure (RLF) is further assumed to occur on the link to the MCG on IAB-node-3. The SCG link to IAB-node-5 may further be in a radio resource control (RRC)-inactive state.

FIG. 13 shows one example for the recovery procedure for scenario 1:

1. The MT on IAB-node-5 conducts radio link monitoring (RLM) on both links and discovers RLF on the link to MCG on IAB-node-3.

2. The MT may report MCG RLF over SCG radio resource control (RRC) to the CU-CP using NR dual connectivity (DC) procedures. This step implies that such reporting is supported by NR DC. In case the SCG link is in RRC inactive state, the MT will resume the RRC connection on this link.

3. The CU-CP migrates the MT's MCG from IAB-node-3 to IAB-node-4 using NR DC procedures. This step implies that such procedure is supported by NR DC.

B. The CU-CP migrates the F1*-U connection with the distributed unit (DU) on IAB-node-5 to Adapt route B. It further uses Adapt route B for F1*-C signaling with the DU on IAB-node-5. This step also has to be applied to all descendent IAB-nodes of IAB-node-5.

C. The CU-CP may release Adapt route A.

After backhaul (BH) RLF recovery, the CU-CP can add topologically redundant BH links and routes. Note that while the Scenario 1 recovery procedure is presented for the case of multi-connectivity of single-MT IAB-nodes, it is expected that a similar solution is applicable to the case of multi-connected multi-MT IAB-nodes.

In scenario 2 (FIGS. 14 and 15), the MT on IAB-node-5 is singly connected to IAB-node-3. One adaptation layer route has been established via IAB-node-3 referred to as Adapt route A. The RLF is assumed to occur on the link between IAB-node-5 and its parent node IAB-node-3.

FIG. 15 shows one example of the recovery procedure for scenario 2:

1. The MT on IAB-node-5 conducts RLM on the link to its parent and discovers the RLF.

2. The MT on IAB-node-5 synchronizes with the DU on IAB-node-4 and performs a random access channel (RACH) procedure.

3. The MT on IAB-node-5 initiates RRC-Connection-Reestablishment, leveraging existing NR procedures. Since the central unit (CU) is the same as before, it has all the context of this MT. IAB-node-5 discovers that the CU has not changed through a CU-specific identifier provided to the MT. Consequently, IAB-node-5's DU can keep the existing F1-application protocol (AP) with the CU.

A. The CU-CP establishes Adapt route B to IAB-node-5 via IAB-donor DU2, IAB-node-2 and IAB-node-4.

B. The CU-CP migrates F1*-U with the DU on IAB-node-5 to Adapt route B. It further uses Adapt route B for F1*-C signaling with the DU on IAB-node-5. This step also should be applied to all descendent IAB-nodes of IAB-node-5.

C. The CU-CP may release Adapt route A.

After BH RLF recovery, the CU-CP can add topologically redundant BH links and routes.

In scenario 3 (FIGS. 16 and 17), the MT on IAB-node-5 is single-connected to IAB-node-3. One adaptation layer route has been established via IAB-node-3 referred to as Adapt route A. The RLF is assumed to occur on the link between IAB-node-5 and its parent node IAB-node-3.

FIG. 17 shows one example for the recovery procedure for scenario 3:

1. The MT on IAB-node-5 conducts RLM on the link to its parent and discovers RLF.

2. The MT on IAB-node-5 synchronizes with the DU on IAB-node-4 and performs a random access channel (RACH) procedure.

3. The DU on IAB-node-5 discontinues service since it has lost F1*-C connectivity to gNB-CU-1.

4. The MT on IAB-node-5 initiates RRC-Connection-Reestablishment, leveraging existing NR procedures. Since the CU is different, it may or may not be able to fetch the context of this MT. IAB-node-5 discovers that the CU has changed from a CU-specific identifier provided to the MT. Consequently, IAB-node-5 has to restart F1-AP from its DU to the new CU.

A. The new CU-CP establishes Adapt route B to IAB-node-5 via IAB-donor DU2, IAB-node-2 and IAB-node-4.

B. The DU on IAB-node-5 initiates a new F1*-C connection to the new CU-CP. This procedure is the same as IAB-node setup phase 2.2 described in section 9.3 of 3GPP Technical Report (TR) 38.874. The DU will obtain a new configuration during that procedure, e.g., a new physical cell identity (PCI). After that, the DU resumes service.

5. The UE determines RLF with the prior DU entity on IAB-node-5.

6. The UE discovers and selects the new DU entity on IAB-node-5.

7. The UE conducts a random access procedure with this new DU entity on IAB-node-5.

8. The UE initiates RRC-Connection-Reestablishment with the new CU-CP, leveraging NR procedures. The new CU-CP may or may not be able to fetch the UE's context from the old CU-CP. The new CU-CP will set up F1*-U for the UE with the new DU on IAB-node-5 following NR procedures.

C. The CU-CP releases Adapt route A. This release may be based on F1*-C failure detection.

After BH RLF recovery, the CU-CP can add topologically redundant BH links and routes.

Steps 3, 4, A, B, C and potentially steps 1 and 2 also may have to be applied by all descendant IAB-nodes of IAB-node-5. Further, steps 4, 5 and 6 may also be applied by all UEs connected to descendant IAB-nodes of IAB-node-5.

As these steps show, the BH RLF recovery procedure via a new backhaul link with a different CU may cause multiple subsequent RLFs for descendant IAB-nodes and UEs. This may cause long service interruption for UEs. Further enhancements may be used to reduce this service interruption.

Downstream Notification of BH RLF in Architecture 1a

When the IAB-node observes RLF on its parent link, it cannot provide further backhaul service to downstream IAB-nodes. Also, child IAB-nodes cannot further serve their descendant IAB-nodes. One example is shown in FIG. 18, where IAB-node-5 observes RLF in the link to its parent IAB-node-3 and subsequently cannot provide backhaul service to its child node, i.e., IAB-node-6.

While the IAB-node observing RLF is aware about backhaul connectivity loss, the descendent IAB-nodes do not have explicit means to identify this upstream backhaul connectivity loss. In case the RLF can be recovered swiftly, as can be expected for BH-RLF-recovery scenario 1, there may be no need to explicitly inform the descendant IAB-nodes about the temporary BH connectivity loss. When the BH RLF cannot be recovered swiftly, it may be beneficial to release backhaul connectivity to descendant IAB-nodes so that they themselves can seek means to recover from the BH RLF. For this purpose, three options may be considered:

Option 1: The IAB-node DU discontinues service. Consequently, the child nodes will also determine BH RLF and follow through the above procedures to recover its link to the backhaul network.

Option 2: The IAB-node DU explicitly alerts child IAB-nodes about the upstream RLF. Child IAB-nodes receiving this alert can forward the alert further downstream. Each IAB-node receiving such alert initiates BH-RLF recovery as discussed above.

Option 3: Every IAB-node can regularly share information on, e.g., BH quality, to its child or parent IAB-nodes. In this manner, downstream or upstream RLF can be sensed without taking explicit actions.

In case a descendant IAB-node (such as IAB-node 6) can recover from such an upstream RLF by using one of the procedures described above, its DU can provide BH RLF-recovery for former ancestor nodes (such as IAB-node 5).

Efficient Backhaul Link Failure Recovery

The recovery procedure for backhaul failure scenarios 2 and 3 includes identifying an alternate parent node and establishing/re-establishing the control plane and user plane through the alternate parent node. However, identifying and attaching to an alternate node can take a significant amount of time and also may not always be possible, e.g., due to lost connectivity with the donor CU or due to lack of alternative parent nodes (especially in millimeter-wave deployments). It may be useful to consider how the IAB network is reorganized when there is a backhaul failure in a way that minimizes interruption time of connection with the IAB-donor.

FIG. 19 illustrates a scenario of a backhaul failure on one of the links in an IAB network. In such scenarios, many IAB-nodes and UEs may be left without a connection to the IAB-donor and may need to find alternate parent nodes. Downstream IAB-nodes (e.g., IAB-nodes 4, 6 in FIG. 19) and the IAB-donor may need to be informed of the backhaul failure. Furthermore, if all the affected IAB-nodes simultaneously try to find alternate parent nodes, the resulting topology may be inefficient.

The following can be considered for recovery from backhaul failures:

Information can be provided to downstream IAB-nodes regarding backhaul failure including a list of nodes that cannot serve as parent nodes due to the backhaul failure.

Preparation of alternative backhaul links and routes in advance (i.e., before occurrence of RLF).

As discussed above, there are different backhaul failure scenarios and different mechanisms to recover from them. The problem is further illustrated in FIG. 20, where several IAB nodes may be left disconnected from the IAB-donor (Node A1) due to a failure of a backhaul link on the path to the donor. For the scenario shown in FIG. 20, the failure of the backhaul link of IAB node C will cause the descendant nodes of IAB node C (D, I, J, and K) to be disconnected as well.

As also discussed above, mechanisms are already proposed where the affected IAB node (i.e., node C) can send indications to its descendant IAB nodes. The descendant IAB nodes can then try to find alternate parent nodes. However, this may lead to a chaotic situation where several nodes are trying to find alternate paths at the same time. This increases the overall signaling load. Also, several UEs will end up being impacted, as data flow may be interrupted during the path switching of all these IAB nodes. One reason for the long data flow interruption could be that some nodes are only in the coverage area of candidate parent nodes which are also affected by the same backhaul failure and therefore cannot re-establish the backhaul until those other potential parent nodes have first re-established their own backhaul. Another issue with this solution is that suboptimal backhaul path may be selected since nodes will establish backhaul connections with nodes that are only suitable at a given time. These connections may become sub-optimal once more candidate nodes (which were affected by the outage) get connected. Later, it might be required to optimize the "tree" structure of the connected IAB by moving some nodes to other parents, particularly after all nodes have been connected. This optimization of the tree structure will cause extra signaling load and possibly additional end user service interruptions.

In the failure recovery scenarios described above, either existing connections were used to establish the new route or new alternate parent nodes/paths had to be established to enable the new path. However, in some situations, this process (identifying and attaching to alternative parent nodes) can take a significant amount of time and may not even be possible due to unavailability of alternative parent node(s).

SUMMARY

Some embodiments advantageously provide methods, and network nodes for efficient backhaul link failure recovery in Integrated Access Backhaul (IAB) networks as compared with known solutions.

An aspect of some embodiments is to define solutions for re-establishing the connectivity for nodes affected by a link break. Mechanisms are described herein to recover the connection in an efficient way, avoiding situations of long service interruption and heavy signaling load. Some embodiments do this by introducing several approaches, allowing more intelligent or optimal selection of nodes that begin to re-establish the connectivity, making it possible for other nodes to continue to serve end user traffic (at a suitable rate) while waiting for the connection to be re-established. Some embodiments also provide a mechanism for handling the case when some nodes are not able to re-establish the connection by themselves. By selecting which nodes should start re-establishing the connection, it is possible to avoid further optimizations of the tree structure, thus minimizing extra signaling and service interruption.

In one embodiment, when there is any link failure in the backhaul link between a first IAB node and its parent, this information can be communicated to some or all IAB nodes/UEs that will be affected (i.e., all whose data is configured to traverse the failed link). In some embodiments, the IAB nodes/UEs getting this information can pause or throttle uplink (UL) data transmission (e.g., reduce its transmission rate), thus avoiding potential buffer overflows during the process to establish a new link.

An alternative embodiment involves establishing the connection in a hierarchical way. Thus, if the first IAB node fails to find an alternative backhaul link to replace the failed link, it may again inform (implicitly or explicitly) one or more of its first level child IAB nodes. Afterward, one or more of the first level child IAB node(s) will initiate a search for a new parent node in order to reconnect with the IAB-donor node. The first child IAB node(s) may start searching for a new parent node just after receiving the first indication from the first IAB node about the backhaul link failure, but may not start connecting to the new parent node until the first level child IAB nodes get a second indication. Upon successful reconnection to the IAB-donor via another parent node, a first level child IAB node may become the new parent node for the first IAB node (i.e., the old parent becomes a child of the former child now acting as a parent to the first IAB node). In addition, the other affected IAB nodes/UEs are notified (implicitly or explicitly) to resume normal operation.

However, if the first level child IAB nodes also fail to find an alternative parent node for reconnection to the IAB-donor node, then, in some embodiments, the first level child nodes will notify the second level child IAB nodes in the downstream hierarchy to search for a new parent node. The second level child nodes will repeat the same process performed by the first child nodes, i.e., serve as the new parent node for the first IAB node and first level child IAB nodes and indicate other affected IAB nodes/UEs to resume normal operation when it manages to reconnect to the IAB-donor node via an alternative parent node. Or alternatively the second level child node may notify the next third level child IAB nodes to find an alternative parent node for reconnection to the IAB-donor, and so on. In this downstream hierarchy of affected IAB nodes, either all or some of the affected IAB nodes can perform the above described process.

Thus, in some embodiments, when operating in some hierarchical modes, the first IAB node will notify only its immediate child or children, and only if this fails and the first child or children don't find an alternate path, then the second child nodes will be notified and so on.

According to one aspect, a network node configured to communicate with a first parent network node and a first child network node is provided. The network node includes processing circuitry configured to detect a failure of a backhaul link in an integrated access backhaul, IAB, network between the network node and the first parent network node of the network node. The processing circuitry is further configured to attempt to find an alternative backhaul link to replace the failed backhaul link. If the attempt to find an alternative backhaul link fails, then the processing circuitry is configured to communicate a first indication of an existence of the failure to the first child network node one level below the network node affected by the failure, and cause the first child network node to find another network node to serve as a new parent network node. If the attempt to find an alternative backhaul link succeeds, then the processing circuitry is configured to utilize the alternative backhaul link.

According to this aspect, in some embodiments, when the first child network node finds another node to serve as the new parent network node, the network node is configured to serve as a second child network node of the first child network node so that the first child network node serves as a parent of the network node. In some embodiments, when no child network node one level below the network node finds a new parent network node, a third child network node one level below the first child network node is configured to search for another network node to serve as the new parent network node. In some embodiments, when the first child network node finds another node to serve as the new parent network node, all child network nodes below a level of the first child network node are caused to resume operation. In some embodiments, the first child network node is a wireless device. In some embodiments, the processing circuitry is further configured to forward the first indication to a subset of less than all child network nodes below a level of the network node. In some embodiments, the network nodes in the subset are selected based at least in part on whether data transmission or reception by the network node occurs within a time duration of when the first indication is received. In some embodiments, the network nodes in the subset are selected based at least in part on whether a volume of data transmitted or received by the network node within a time duration of when the first indication is received. In some embodiments, the network nodes in the subset are selected based at least in part on whether a child network node would be affected by the failure. In some embodiments, the network nodes in the subset are selected based at least in part on a priority of data to be transmitted or received by the network node. In some embodiments, the network nodes in the subset are selected based at least in part on a quality of service provided by the first child network node.

According to another aspect, a method implemented in a network node having a first parent network node and a first child network node is provided. The method includes detecting a failure of a backhaul link in an integrated access backhaul, IAB, network between the network node and the first parent network node of the network node. The method also includes attempting to find an alternative backhaul link to replace the failed backhaul link. If the attempt to find an alternative backhaul link fails, then the method includes communicating a first indication of an existence of the failure to the first child network node one level below the network node affected by the failure and causing the first child network node to find another network node to serve as a new parent network node. The method further includes, if the attempt to find an alternative backhaul link succeeds, then utilizing the alternative backhaul link.

According to this aspect, in some embodiments, when the first child network node finds another node to serve as the new parent network node, the network node serves as a second child network node of the first child network node so that the first child network node serves as a parent of the network node. In some embodiments, when no child network node one level below the network node finds a new parent network node, then a third child network node one level below the first child network node searches for another network node to serve as the new parent network node. In some embodiments, when the first child network node finds another node to serve as the new parent network node, all child network nodes below a level of the first child network node resume operation. In some embodiments, the method further includes forwarding the first indication to a subset of less than all child network nodes below a level of the network node. In some embodiments, the network nodes in the subset are selected based at least in part on whether data transmission or reception by the network node occurs within a time duration of when the first indication is received. In some embodiments, the network nodes in the subset are selected based at least in part on whether a volume of data transmitted or received by the network node within a time duration of when the first indication is received. In some embodiments, the network nodes in the subset are selected based at least in part on whether a child network node would be affected by the failure. In some embodiments, the network nodes in the subset are selected based at least in part on a priority of data to be transmitted or received by the network node. In some embodiments, the network nodes in the subset are selected based at least in part on a quality of service provided by the first child network node.

According to another aspect, a network node is configured to communicate with a first parent network node and a first child network node. The network node includes processing circuitry configured to receive from the first parent network node an indication of a failure of a backhaul link upstream from the first parent network node, and attempt to find another network node to serve as a new parent network node. If a new parent network node is found, then the processing circuitry is configured to configure the first parent network node to serve as a child of the network node. If a new parent network node is not found, then the processing circuitry is configured to cause the first child network node to search for an alternative backhaul link.

According to yet another aspect, a method implemented in a network node in communication with a first parent network node and a first child network node is provided. The method includes receiving from the first parent network node an indication of a failure of a backhaul link upstream from the first parent network node, and attempting to find another network node to serve as a new parent network node. If a new parent network node is found, then the method includes configuring the first parent network node to serve as a child of the network node. If a new parent network node is not found, then the method includes causing the first child network node to search for an alternative backhaul link.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
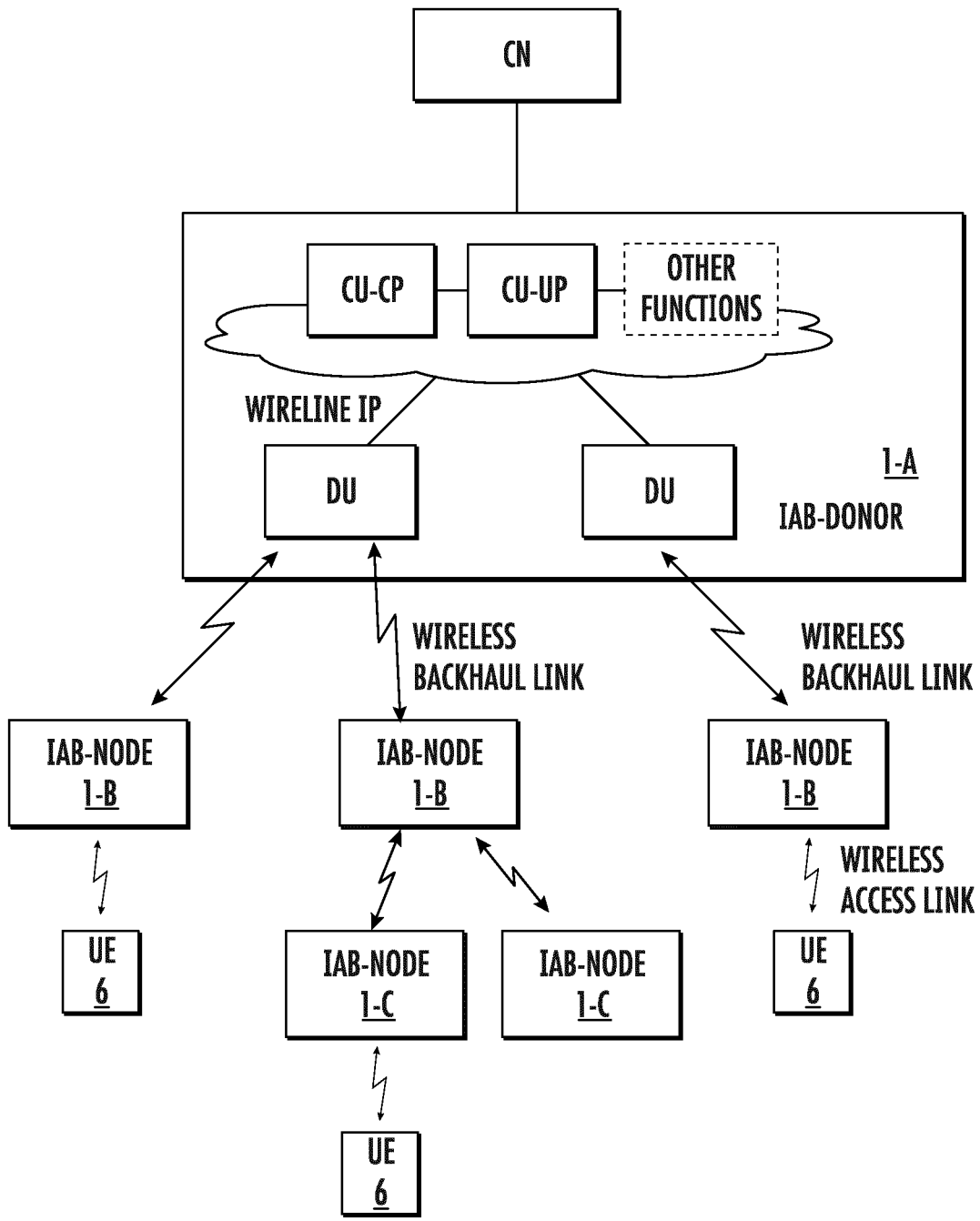
FIG. 1 is a reference diagram for Integrated Access Backhaul (IAB) in a standalone mode.
Figure 2:
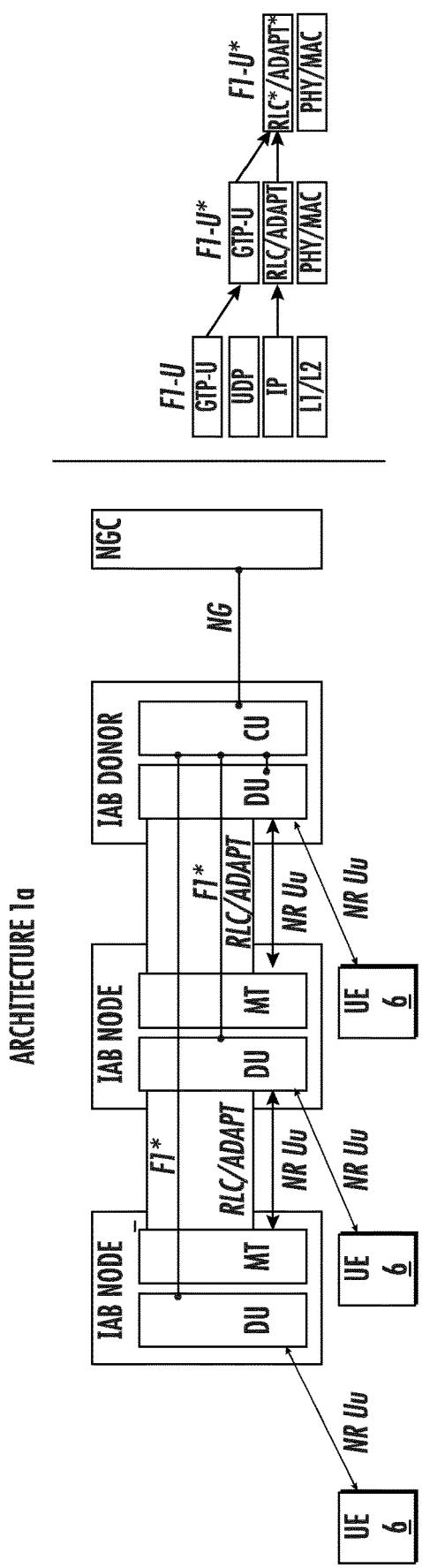
FIGS. 2-6 illustrate example architectures to implement IAB identified by the 3GPP.
Figure 3:
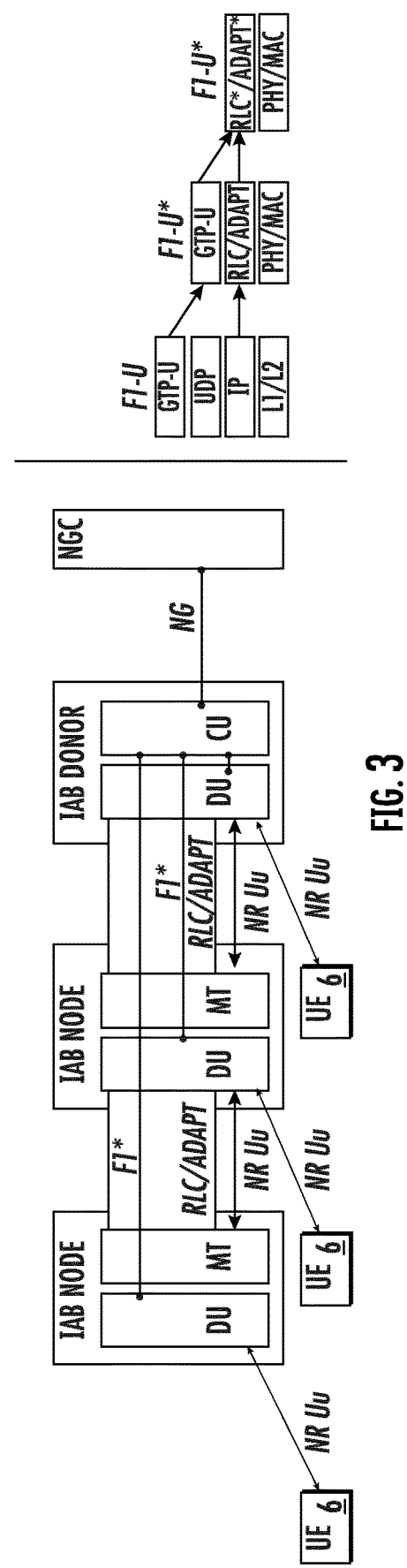
Figure 4:
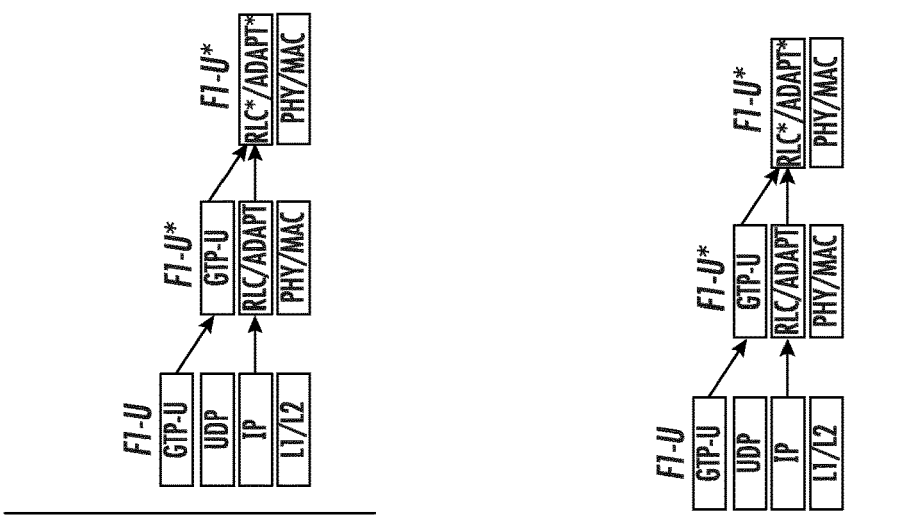
Figure 4:
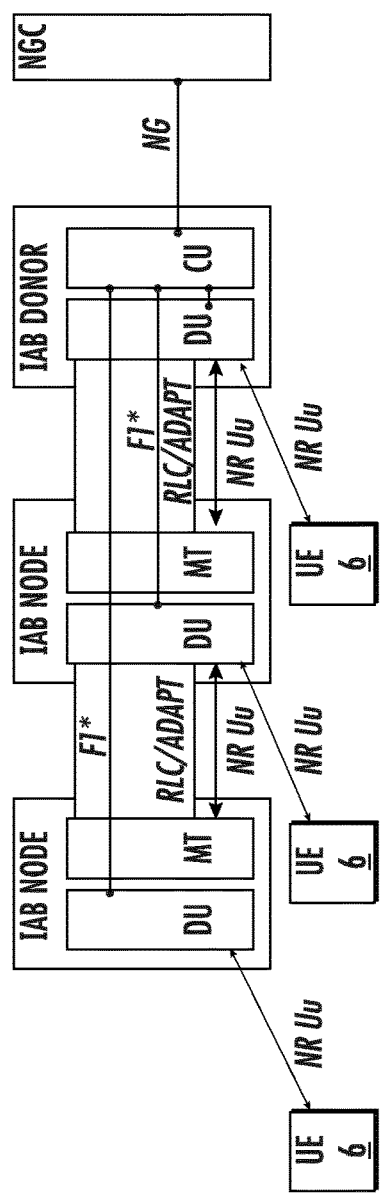
Figure 5:
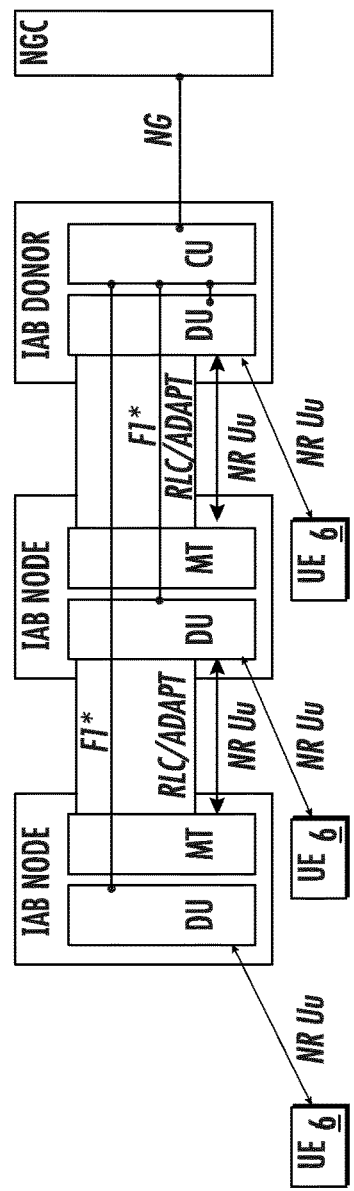
Figure 6:
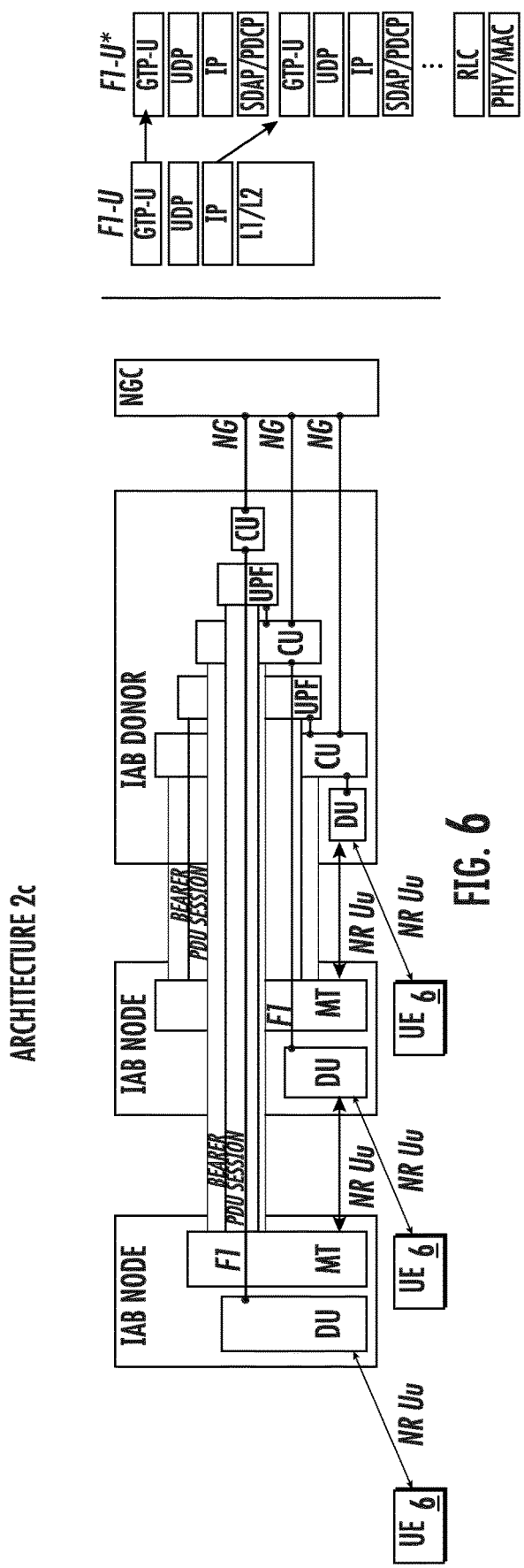
Figure 7:
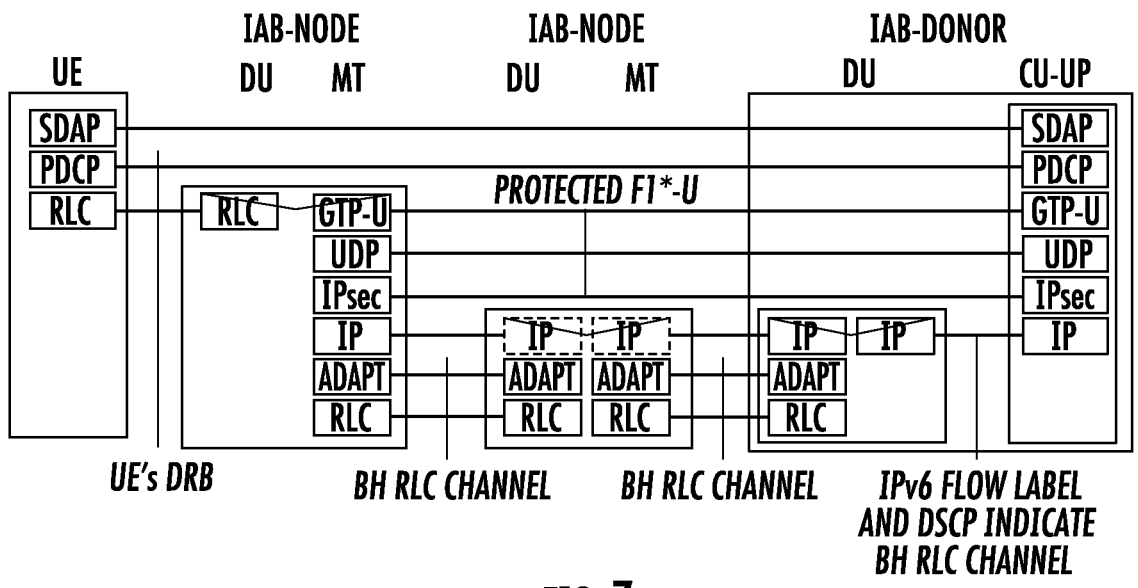
FIGS. 7 and 8 illustrate user plane (UP) and control plane (CP) protocol stacks for the standardized architecture shown in FIG. 2.
Figure 8A:
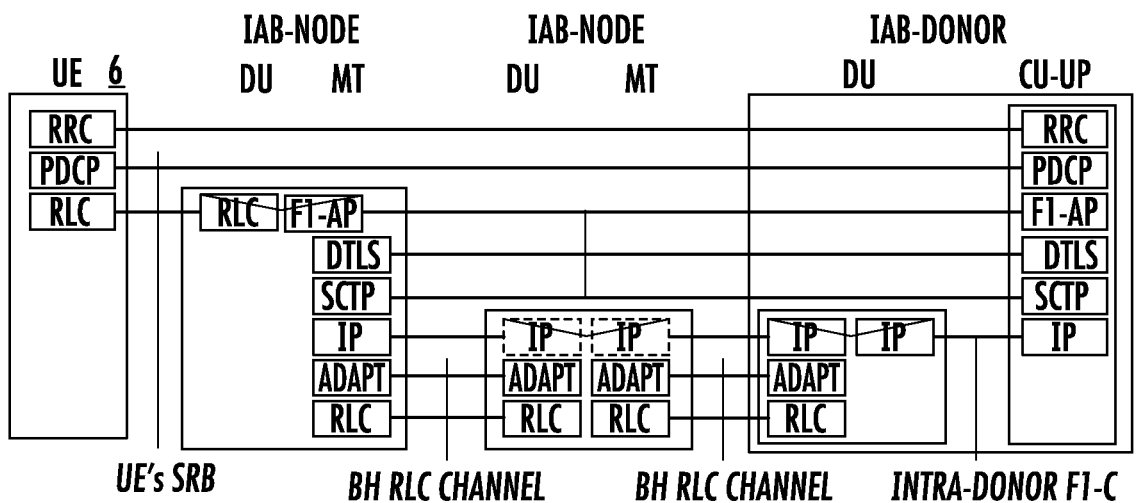
Figure 8B:
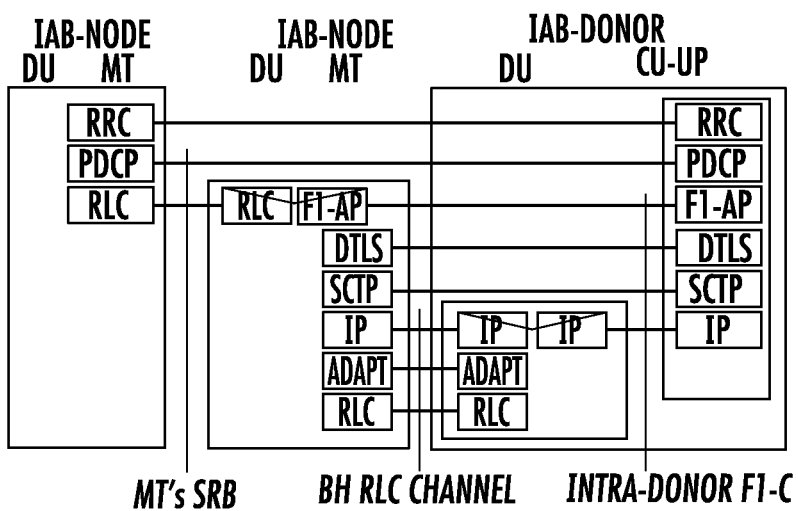
Figure 8C:
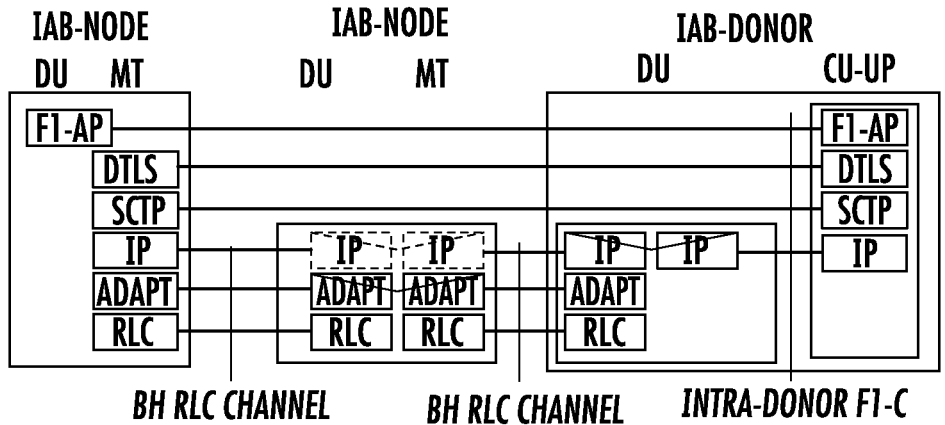
Figure 9:
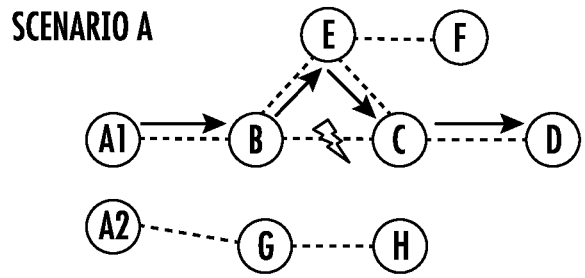
FIGS. 9-11 illustrate scenarios for backhaul (BH) link failure.
Figure 10:
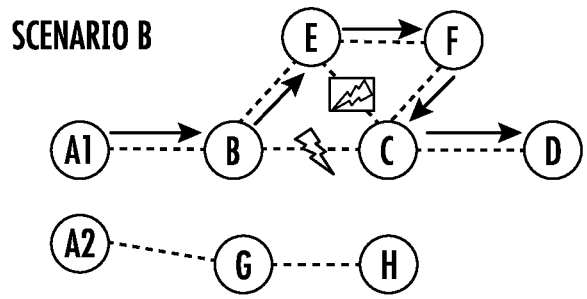
Figure 11:
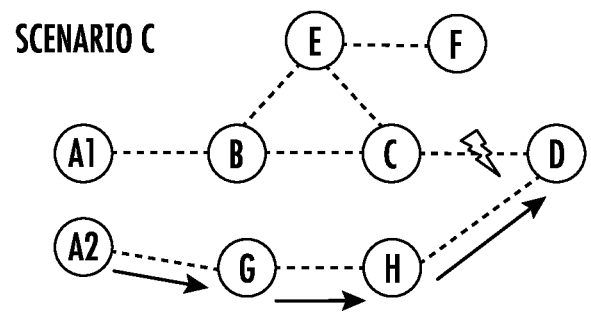
Figure 12A:
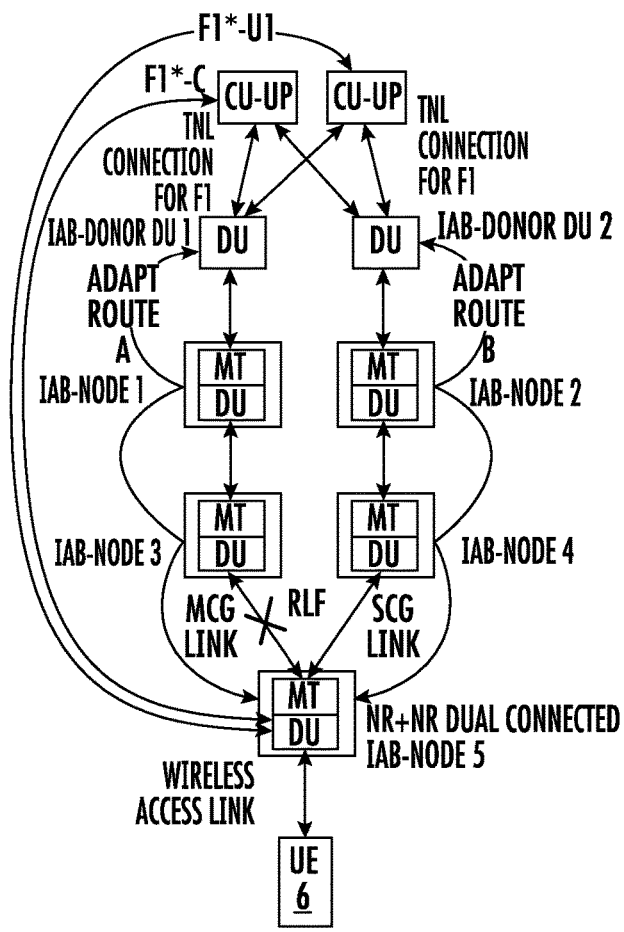
FIGS. 12 and 13 illustrate recovery via an existing BH link.
Figure 12B:
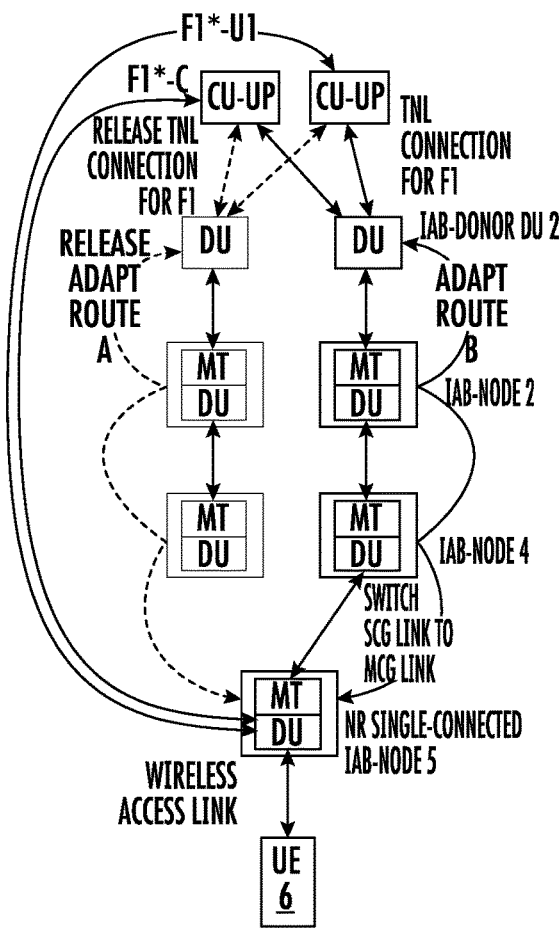
Figure 13:
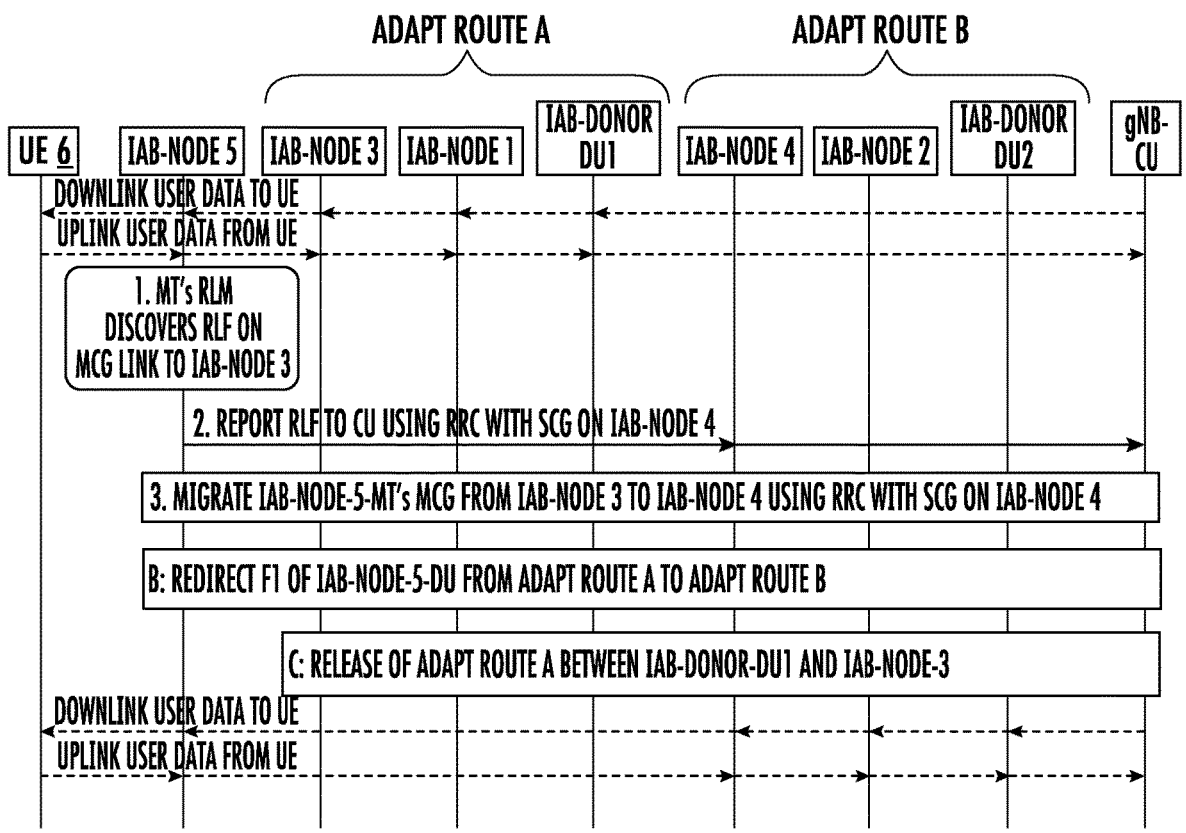
Figure 14A:
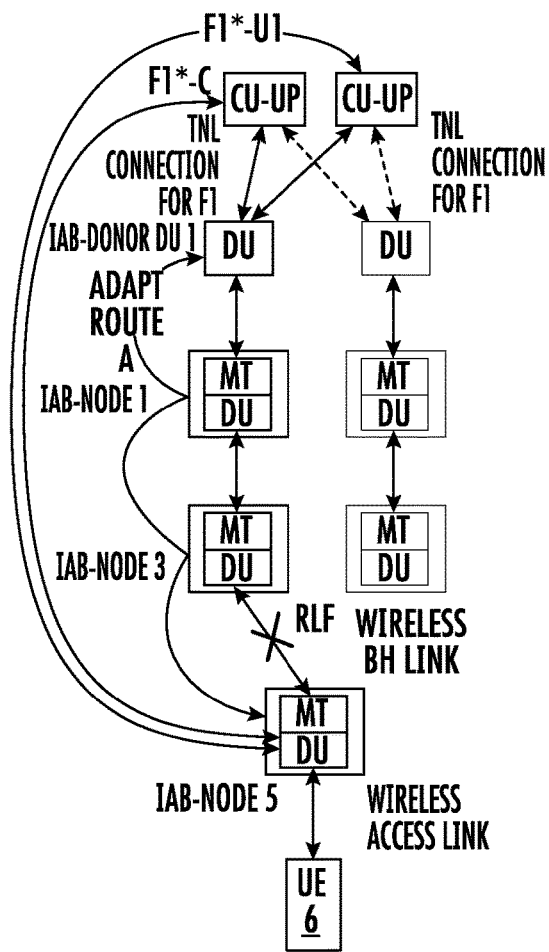
FIGS. 14 and 15 illustrate recovery via a newly established BH link using the same IAB donor central unit (CU)
Figure 14B:
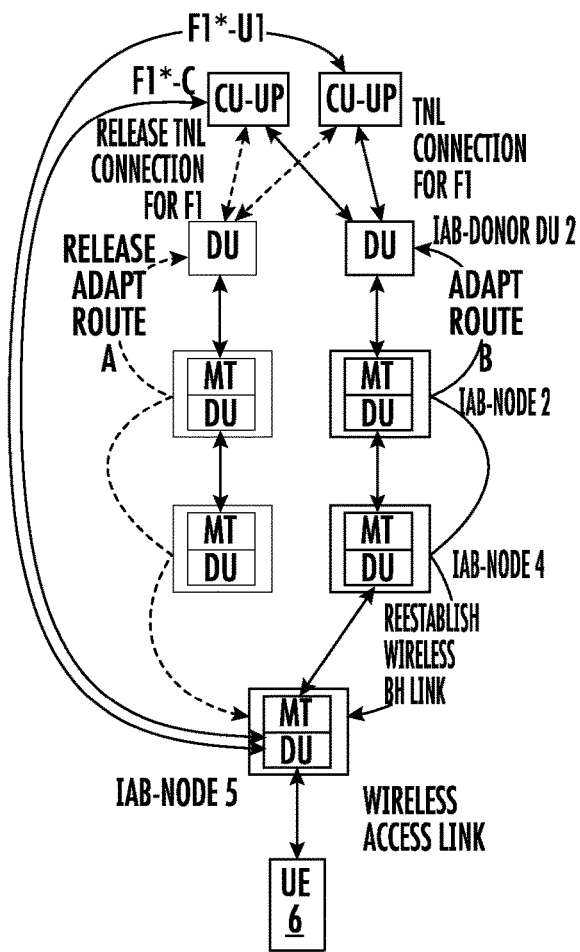
Figure 15:
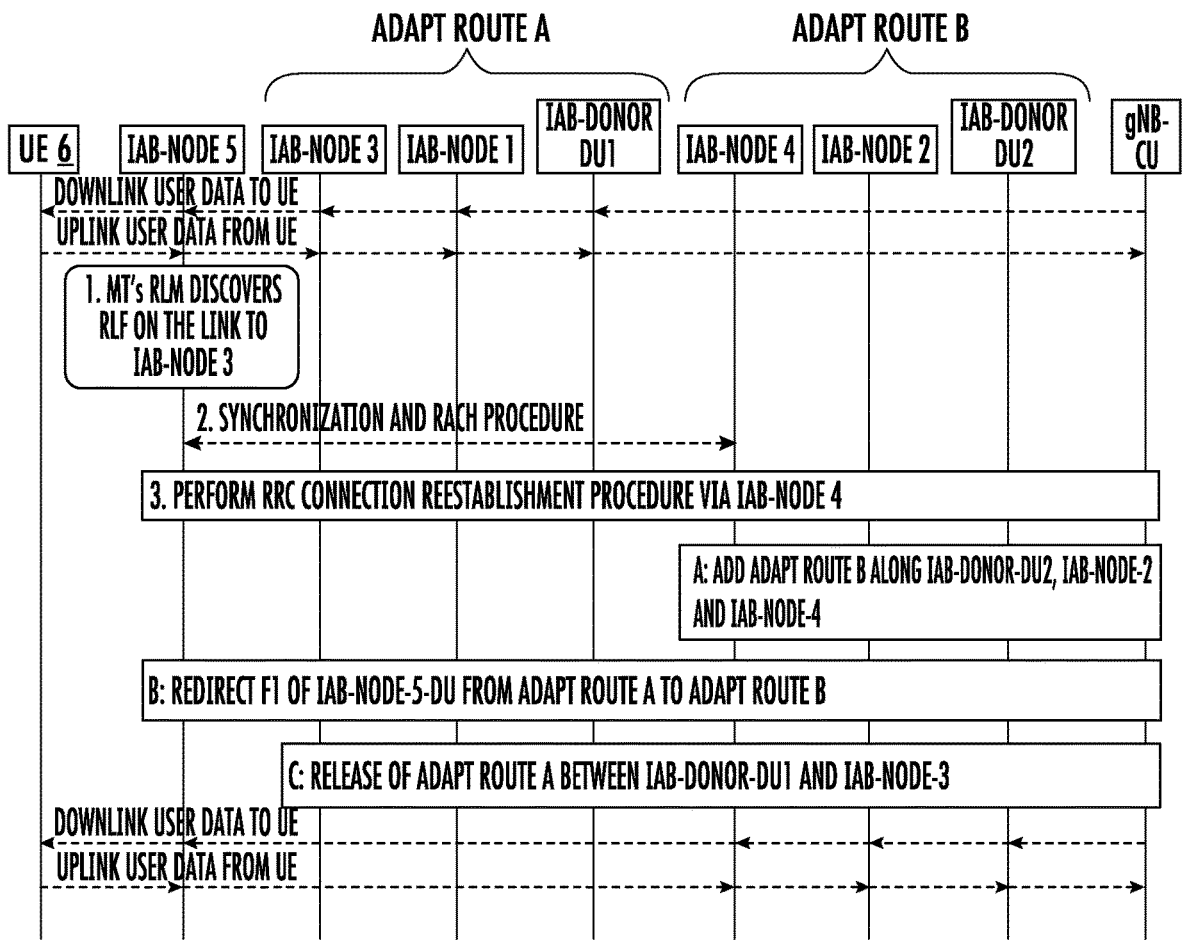
Figure 16A:
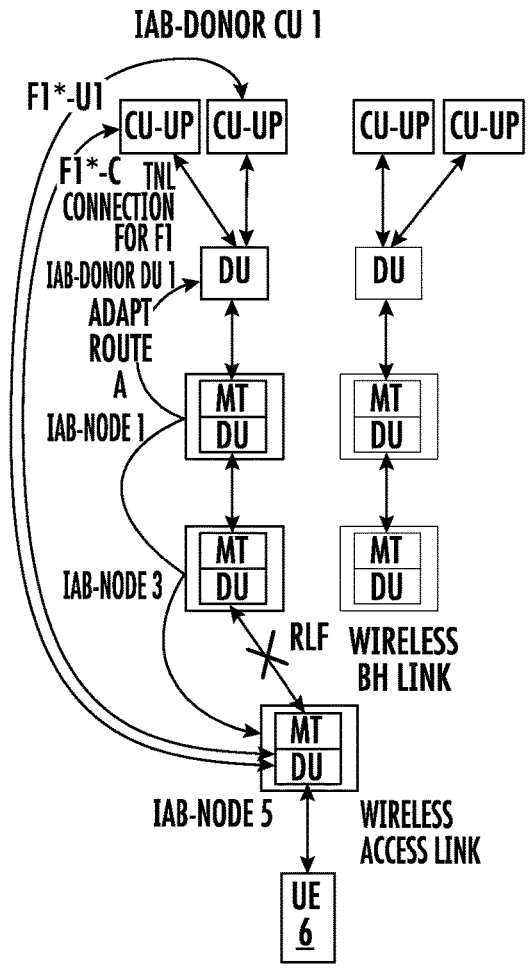
FIGS. 16 and 17 illustrate recovery via a newly established BH link using a different IAB donor CU.
Figure 16B:
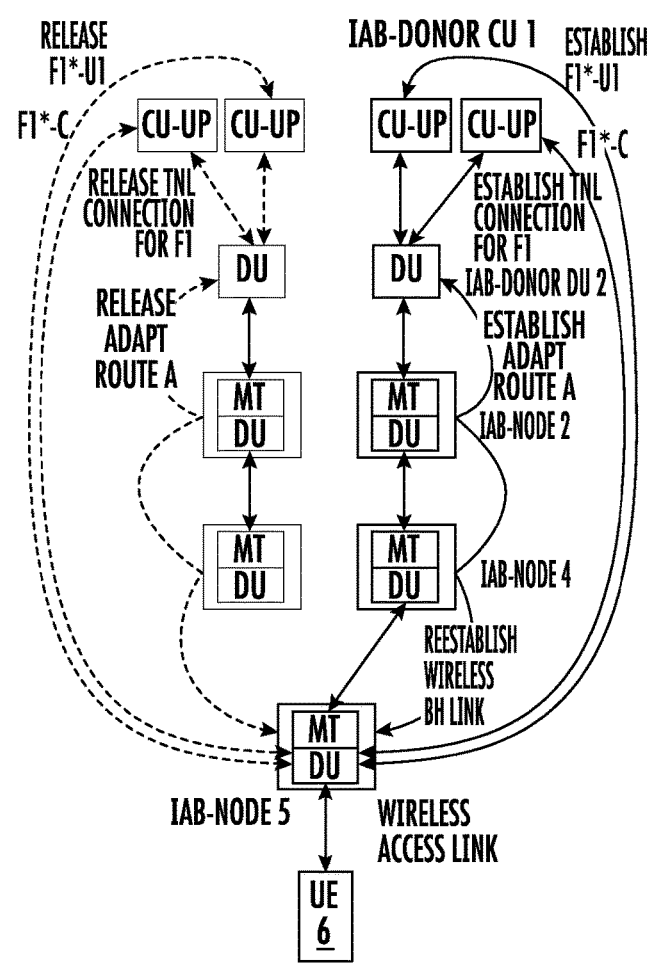
Figure 17:
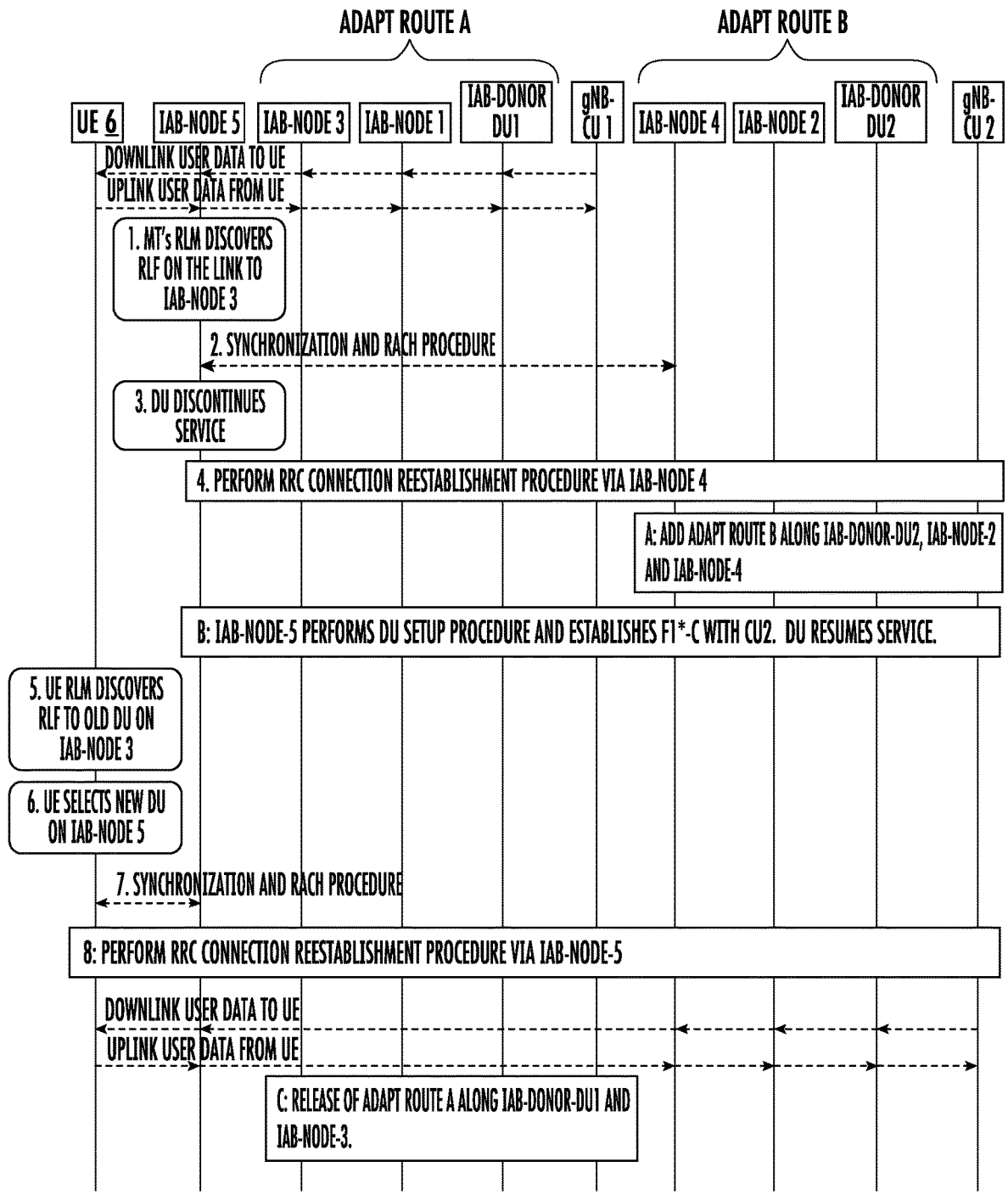
Figure 18:
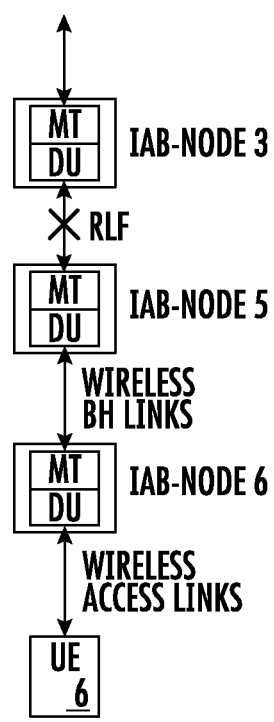
FIG. 18 illustrates an IAB node observing radio link failure (RLF) on its parent link.
Figure 19:
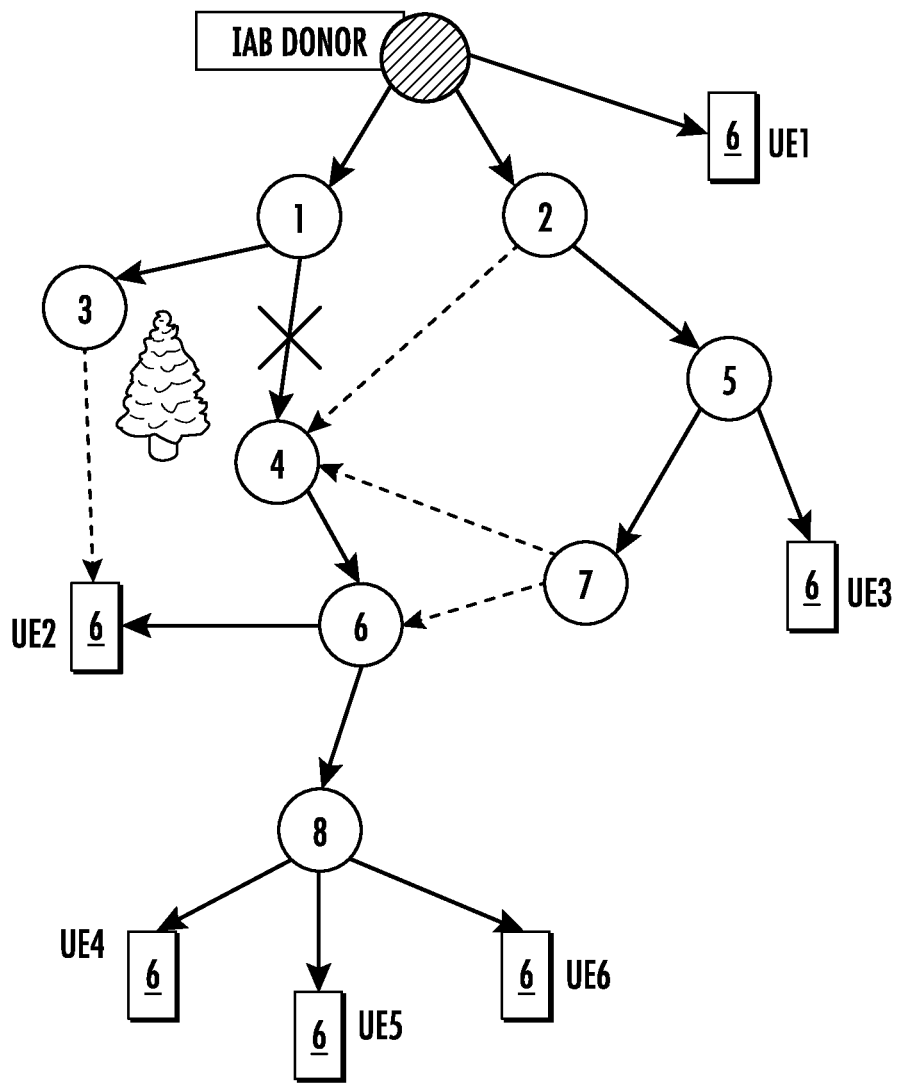
FIG. 19 illustrates a scenario of BH failure on a link in an IAB network.
Figure 20:
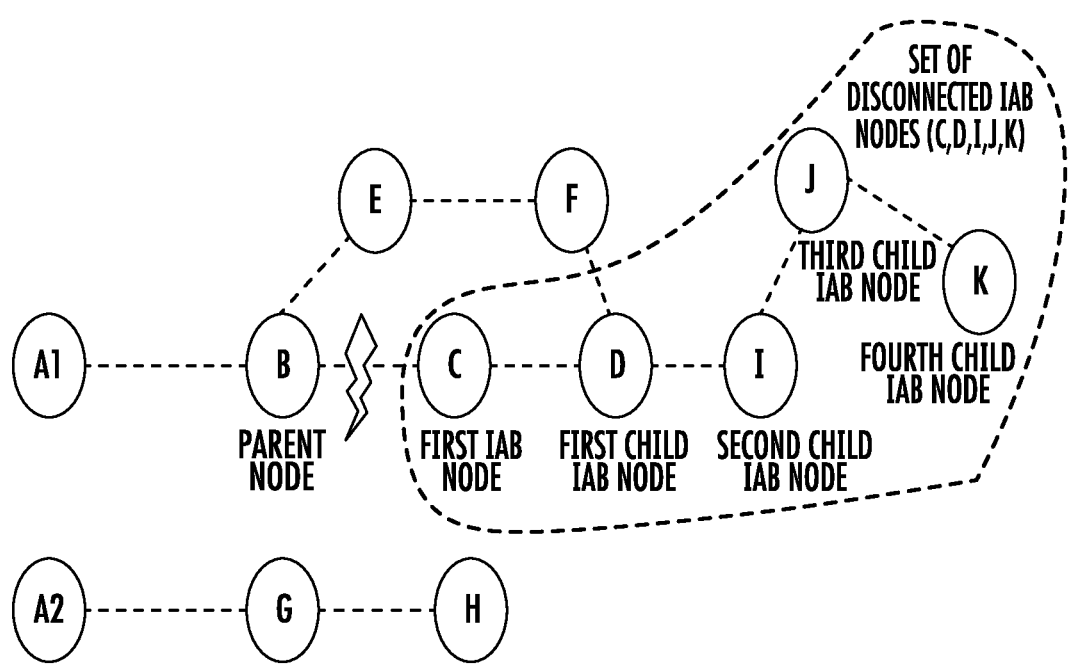
FIG. 20 illustrates a scenario for response to a BH link failure.

Before describing in detail exemplary embodiments, it is noted that the embodiments reside primarily in combinations of apparatus components and processing steps related to efficient backhaul link failure recovery in Integrated Access Backhaul (IAB) networks. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate, and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" or "network node" used herein may be used to also denote a user equipment (UE) such as a wireless device (WD) or a radio network node. Note that a network node may include an IAB node and/or an IAB donor node.

In some embodiments, the non-limiting terms wireless device (WD) or a user equipment (UE) are used interchangeably. The UE herein can be any type of user equipment capable of communicating with a network node or another UE over radio signals, such as a wireless device (WD). The UE may also be a radio communication device, target device, device to device (D2D) UE, machine type UE or UE capable of machine to machine communication (M2M), low-cost and/or low-complexity UE, a sensor equipped with UE, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a user equipment or a network node may be distributed over a plurality of user equipments and/or network nodes. In other words, it is contemplated that the functions of the network node and user equipment described herein are not limited to performance by a single physical device and, in fact, can be distributed among several physical devices.

Note further, that terms such as "find alternate path" or "connect to alternate paths", etc. may refer to the procedure by which an IAB node gets connected to another parent node/path. Generally speaking, a UE connects to a base station either through normal connection setup (RRCSetup), handover (RRCReconfiguration with mobility, also known as reconfiguration with synchronization in new radio (NR)) or re-establishment (which happens during link failures). The setup and re-establishment may be UE initiated, while the handover may be network initiated (i.e. the network sends the reconfiguration message and the UE executes it). Terms such as connect to alternate path may thus refer to the re-establishment procedure. Normally, re-establishment is triggered by a link failure, while in some cases discussed herein, triggering a re-establishment of the child IAB nodes may occur even though their backhaul links to their parent have not failed, but the child's parent has lost its backhaul link to its own parent.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments may ensure IAB network recovery from link failure even if the first IAB node (and/or child IAB nodes) has no alternative parent node to re-establish connection to an IAB-donor node, or has an alternative parent node but cannot connect for some reason, or the alternative parent node can support part of the affected IAB nodes data and traffic.

In addition, some embodiments reorganize the IAB network in a systemic way to avoid at least some of the following problems: increased latency incurred in establishing the alternative path as well as the likelihood of establishing a sub-optimal path; and subsequent additional signaling and service interruptions due to having to optimize suboptimal paths when all nodes are connected.

Figure 21:
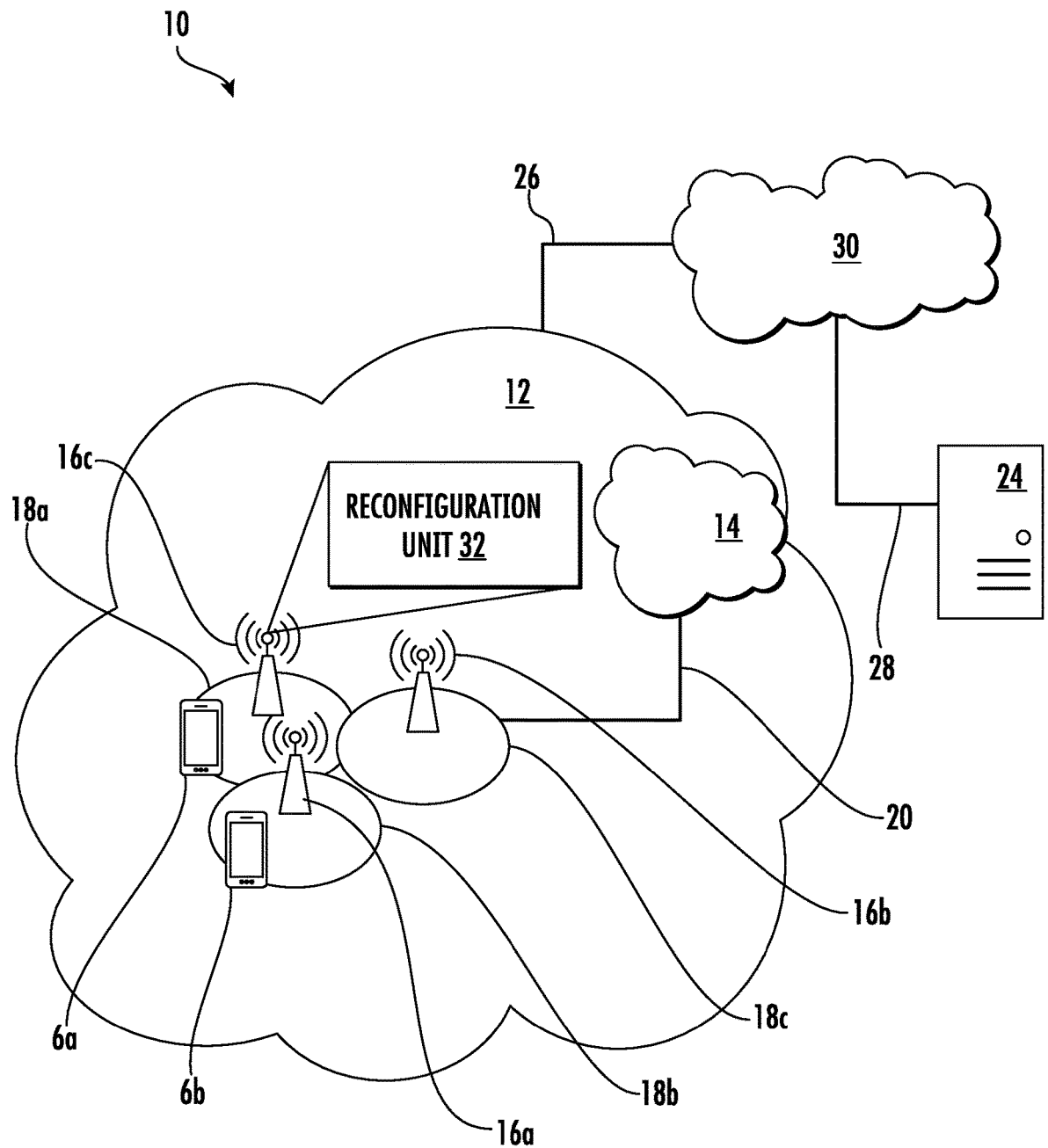
FIG. 21 is a schematic diagram of an exemplary network architecture illustrating a communication system connected via an intermediate network to a host computer according to the principles in the present disclosure.

Referring again to the drawing figures, in which like elements are referred to by like reference numerals, there is shown in FIG. 21 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. Note that each of network nodes 16a, 16b and 16c may serve as a parent IAB node, a child IAB node or both, in an IAB network. A first user equipment UE 6a located in coverage area 18a is configured to wirelessly connect to, or be paged by, the corresponding network node 16c. A second UE 6b in coverage area 18b is wirelessly connectable to the corresponding network node 16a. While a plurality of UEs 6a, 6b (collectively referred to as user equipments 6) are illustrated in this example, the disclosed embodiments are equally applicable to a situation where a sole UE is in the coverage area or where a sole UE is connecting to the corresponding network node 16. Note that although only two UEs 6 and three network nodes 16 are shown for convenience, the communication system may include many more UEs 6 and network nodes 16.

In the embodiments described herein, a network node 16 may be an IAB node which may have parent nodes which are also network nodes 16 and may have child nodes which may also be network nodes 16 and/or UEs 6. Also note that a donor IAB node may also have functionality as that described in reference to network node 16. Hence, IAB nodes, child nodes, parent nodes and donor nodes are all referred to collectively herein as network nodes 16. These nodes may be configured in a hierarchical manner as shown in FIG. 1 or shown in figures to be described below.

Also, it is contemplated that a UE 6 can be in simultaneous communication and/or configured to separately communicate with more than one network node 16 and more than one type of network node 16. For example, a UE 6 can have dual connectivity with a network node 16 that supports LTE and the same or a different network node 16 that supports NR. As an example, UE 6 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 21 as a whole enables connectivity between one of the connected UEs 22a, 22b and the host computer 24. The connectivity may be described as an over-the-top (OTT) connection. The host computer 24 and the connected UEs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or not be informed about the past routing of an incoming downlink communication with data originating from a host computer 24 to be forwarded (e.g., handed over) to a connected UE 6 UE 6a. Similarly, the network node 16 need not be aware of the future routing of an outgoing uplink communication originating from the UE 6 UE 6a towards the host computer 24.

A network node 16 is configured to include a reconfiguration unit 32 which is configured to attempt to find an alternative backhaul link when a backhaul link fails, configured to conditionally cause a child network node to find another network node to serve as a new parent network node, and configured to conditionally cause the network node 16 to serve as a child of a child node of the network node.

Example implementations, in accordance with an embodiment, of the UE 6, network node 16a and 16b, and host computer 24 discussed in the preceding paragraphs will now be described with reference to FIG. 22. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a UE 6 connecting via an OTT connection 52 terminating at the UE 6 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the user equipment 22.

The communication system 10 further includes a network node 16 provided in a communication system 10 and including hardware 58 enabling it to communicate with the host computer 24 and with the UE 6. Even though various components have been omitted from network node 16b in FIG. 22 for ease of understanding, the discussion of the components of network node 16, i.e., network node 16b in FIG. 22, is equally applicable to any of network nodes 16a-16n. For simplicity, in FIG. 22, only the reconfiguration unit 32 is shown in network node 16b. The hardware 58 may include a communication interface 60 for setting up and maintaining a wired or wireless connection with an interface of a different communication device of the communication system 10, as well as a radio interface 62 for setting up and maintaining at least a wireless connection 64 with a UE 6 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include a reconfiguration unit 32 which is configured to attempt to find an alternative backhaul link when a backhaul link fails, configured to conditionally cause a child network node to find another network node to serve as a new parent network node, and configured to conditionally cause the network node 16 to serve as a child of a child node of the network node.

The communication system 10 further includes the UE 6 already referred to. The UE 6 may have hardware 80 that may include a radio interface 82 configured to set up and maintain a wireless connection 64 with a network node 16a serving a coverage area 18 in which the UE 6 is currently located. The radio interface 82 may be formed as or may include, for example, one or more RF transmitters, one or more RF receivers, and/or one or more RF transceivers. In some embodiments, network node 16a may be a parent IAB node and network node 16b may be a child node. The functionality of these network nodes is described below.

The hardware 80 of the UE 6 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the UE 6 may further comprise software 90, which is stored in, for example, memory 88 at the UE 6, or stored in external memory (e.g., database, storage array, network storage device, etc.) accessible by the UE 6. The software 90 may be executable by the processing circuitry 84. The software 90 may include a client application 92. The client application 92 may be operable to provide a service to a human or non-human user via the UE 6, with the support of the host computer 24. In the host computer 24, an executing host application 50 may communicate with the executing client application 92 via the OTT connection 52 terminating at the UE 6 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by UE 6. The processor 86 corresponds to one or more processors 86 for performing UE 6 functions described herein. The UE 6 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to UE 6.

Figure 22:
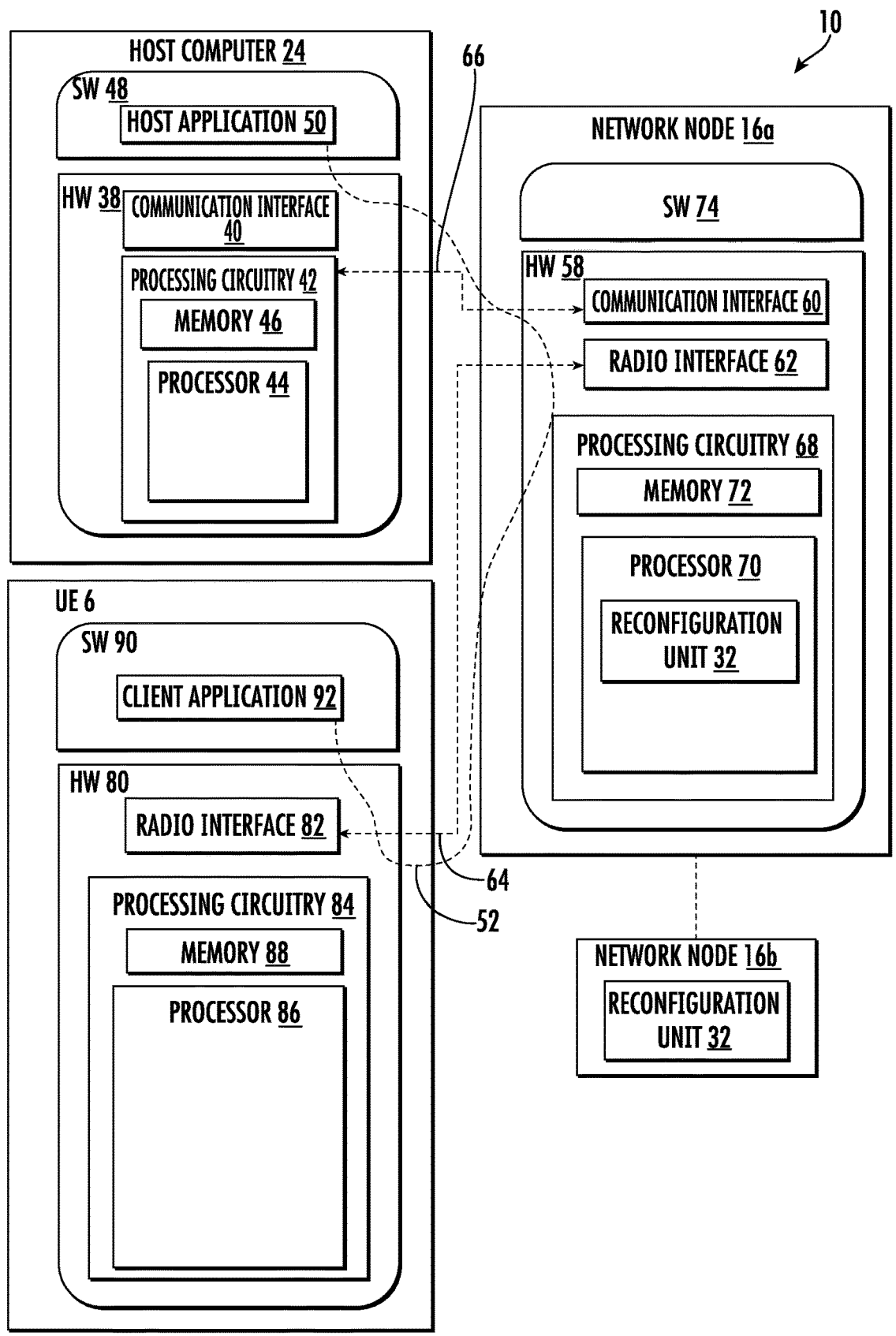
FIG. 22 is a block diagram of a host computer communicating via a network node with a user equipment over an at least partially wireless connection according to some embodiments of the present disclosure.

In some embodiments, the inner workings of the network node 16a, UE 6, and host computer 24 may be as shown in FIG. 22 and independently, the surrounding network topology may be that of FIG. 21. As noted above, the network node 16b may include the same components and functionality as network node 16a. These network nodes may serve as parent nodes and/or child nodes or donor nodes, as will be described below.

In FIG. 22, the OTT connection 52 has been drawn abstractly to illustrate the communication between the host computer 24 and the user equipment 6 via the network node 16, without explicit reference to any intermediary devices and the precise routing of messages via these devices. Network infrastructure may determine the routing, which it may be configured to hide from the UE 6 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the UE 6 and the network node 16 is in accordance with the teachings of the embodiments described throughout this disclosure. One or more of the various embodiments improve the performance of OTT services provided to the UE 6 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and UE 6, in response to variations in the measurement results. The measurement procedure and/or the network functionality for reconfiguring the OTT connection 52 may be implemented in the software 48 of the host computer 24 or in the software 90 of the UE 6, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16a. Some such procedures and functionalities may be known and practiced in the art. In certain embodiments, measurements may involve proprietary UE signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the UE 6. In some embodiments, the cellular network also includes the network node 16a with a radio interface 62. In some embodiments, the network node 16a is configured to, and/or the network node's processing circuitry 68 is configured to perform the functions and/or methods described herein for preparing/initiating/maintaining/supporting/ending a transmission to the UE 6, and/or preparing/terminating/maintaining/supporting/ending in receipt of a transmission from the UE 6.

In some embodiments, the host computer 24 includes processing circuitry 42 and a communication interface 40 that is configured to a communication interface 40 configured to receive user data originating from a transmission from a UE 6 to a network node 16. In some embodiments, the UE 6 is configured to, and/or comprises a radio interface 82 and/or processing circuitry 84 configured to perform the functions and/or methods described herein for preparing/initiating/maintaining/supporting/ending a transmission to the network node 16a, and/or preparing/terminating/maintaining/supporting/ending in receipt of a transmission from the network node 16a.

Although FIGS. 21 and 22 show various "units" such as reconfiguration unit 32 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 23:
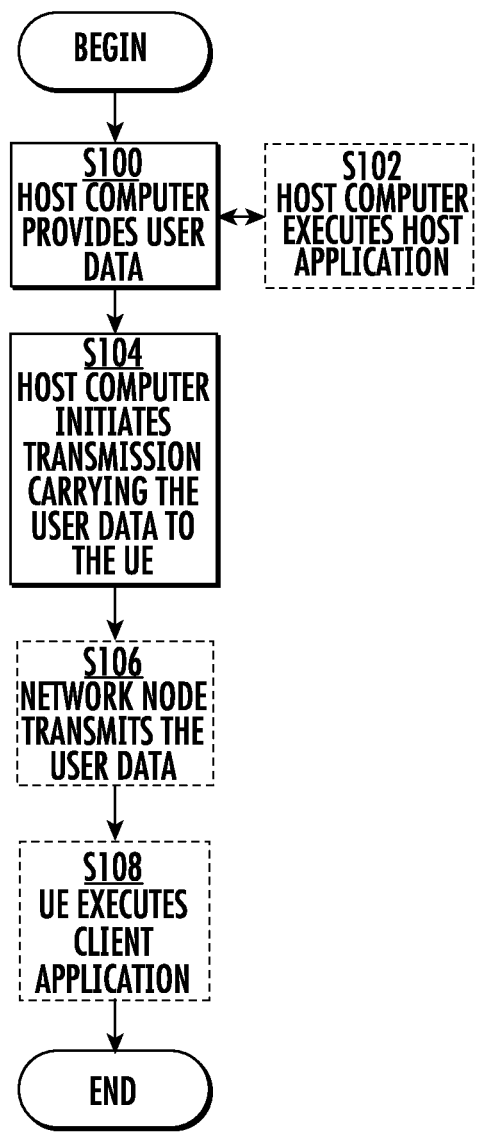
FIG. 23 is a flowchart illustrating exemplary methods implemented in a communication system including a host computer, a network node and a user equipment for executing a client application at a user equipment according to some embodiments of the present disclosure.

FIG. 23 is a flowchart illustrating an exemplary method implemented in a communication system, such as, for example, the communication system of FIGS. 21 and 22, in accordance with one embodiment. The communication system may include a host computer 24, a network node 16 and a UE 6, which may be those described with reference to FIG. 22. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the UE 6 (Block S104). In an optional third step, the network node 16 transmits to the UE 6 the user data which was carried in the transmission that the host computer 24 initiated, in accordance with the teachings of the embodiments described throughout this disclosure (Block S106). In an optional fourth step, the UE 6 executes a client application, such as, for example, the client application 114, associated with the host application 50 executed by the host computer 24 (Block S108).

Figure 24:
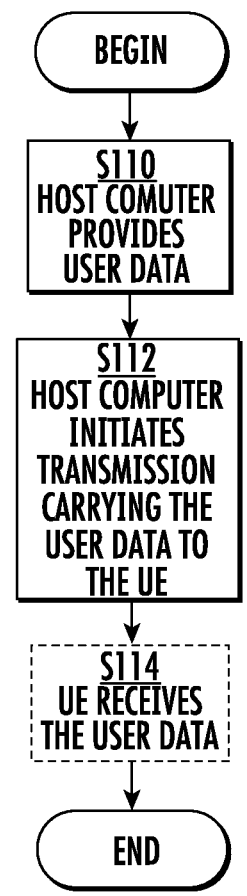
FIG. 24 is a flowchart illustrating exemplary methods implemented in a communication system including a host computer, a network node and a user equipment for receiving user data at a user equipment according to some embodiments of the present disclosure.

FIG. 24 is a flowchart illustrating an exemplary method implemented in a communication system, such as, for example, the communication system of FIG. 21, in accordance with one embodiment. The communication system may include a host computer 24, a network node 16 and a UE 6, which may be those described with reference to FIGS. 21 and 22. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the UE 6 (Block S112). The transmission may pass via the network node 16, in accordance with the teachings of the embodiments described throughout this disclosure. In an optional third step, the UE 6 receives the user data carried in the transmission (Block S114).

Figures 25, 26:
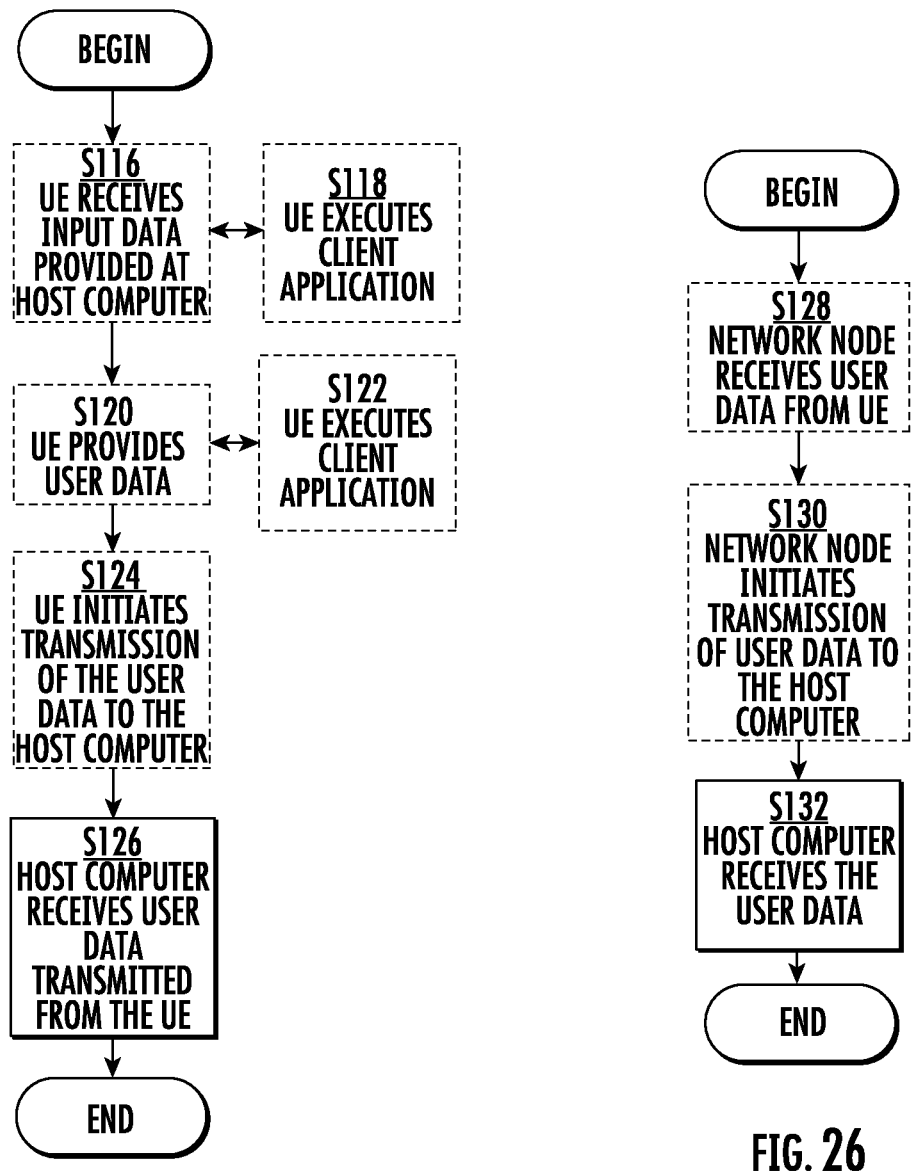
FIG. 25 is a flowchart illustrating exemplary methods implemented in a communication system including a host computer, a network node and a user equipment for receiving user data from the user equipment at a host computer according to some embodiments of the present disclosure.
FIG. 26 is a flowchart illustrating exemplary methods implemented in a communication system including a host computer, a network node and a user equipment for receiving user data at a host computer according to some embodiments of the present disclosure.

FIG. 25 is a flowchart illustrating an exemplary method implemented in a communication system, such as, for example, the communication system of FIG. 21, in accordance with one embodiment. The communication system may include a host computer 24, a network node 16 and a UE 6, which may be those described with reference to FIGS. 21 and 22. In an optional first step of the method, the UE 6 receives input data provided by the host computer 24 (Block S116). In an optional substep of the first step, the UE 6 executes the client application 114, which provides the user data in reaction to the received input data provided by the host computer 24 (Block S118). Additionally or alternatively, in an optional second step, the UE 6 provides user data (Block S120). In an optional substep of the second step, the UE provides the user data by executing a client application, such as, for example, client application 114 (Block S122). In providing the user data, the executed client application 114 may further consider user input received from the user. Regardless of the specific manner in which the user data was provided, the UE 6 may initiate, in an optional third substep, transmission of the user data to the host computer 24 (Block S124). In a fourth step of the method, the host computer 24 receives the user data transmitted from the UE 6, in accordance with the teachings of the embodiments described throughout this disclosure (Block S126).

FIG. 26 is a flowchart illustrating an exemplary method implemented in a communication system, such as, for example, the communication system of FIG. 21, in accordance with one embodiment. The communication system may include a host computer 24, a network node 16 and a UE 6, which may be those described with reference to FIGS. 21 and 22. In an optional first step of the method, in accordance with the teachings of the embodiments described throughout this disclosure, the network node 16 receives user data from the UE 6 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 27:
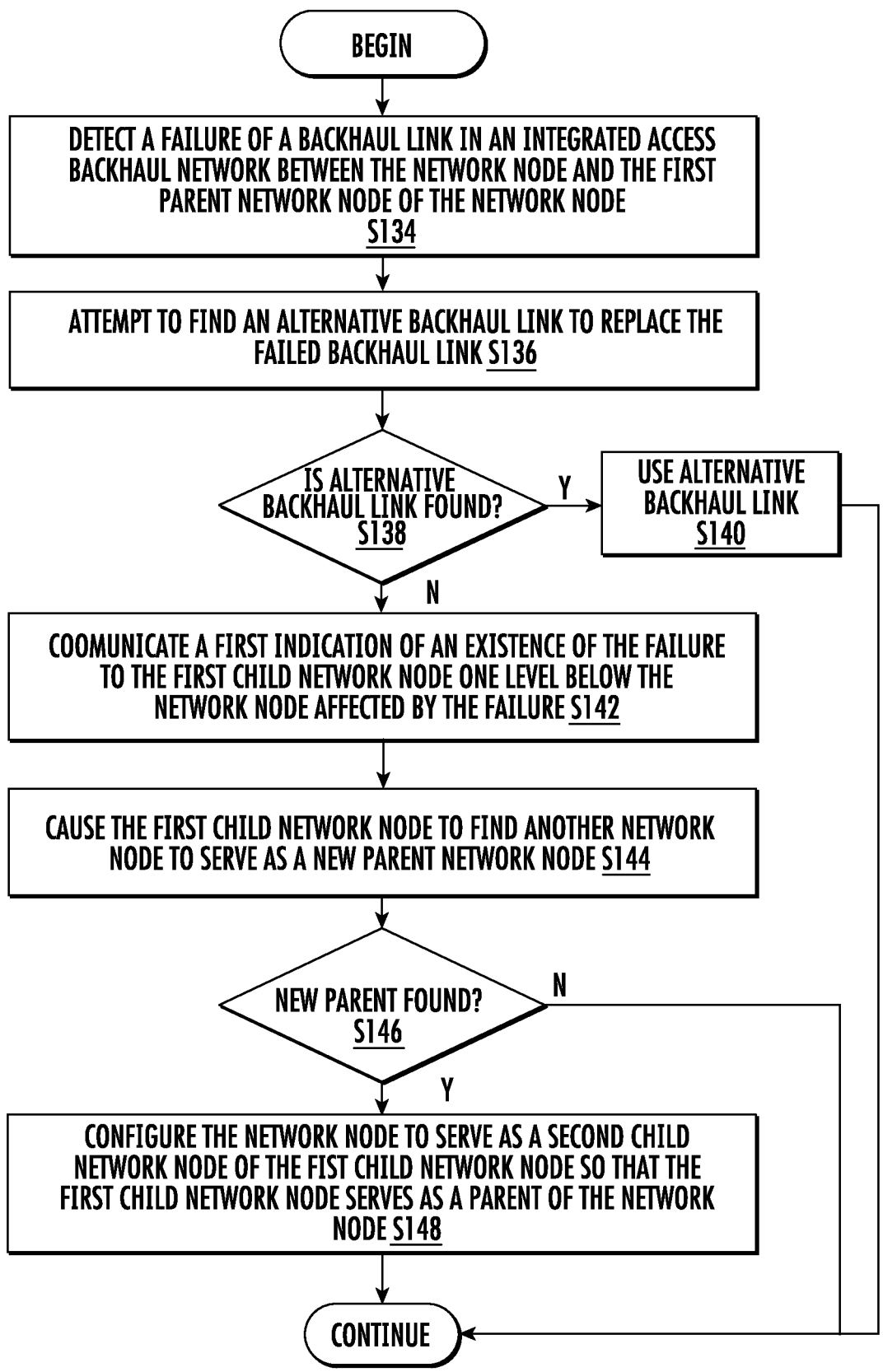
FIG. 27 is a flowchart of an exemplary process in a network node for failure recover from the perspective of a parent node according to some embodiments of the present disclosure.

FIG. 27 is a flowchart of an exemplary process in a network node 16 for failure recovery from the perspective of a parent node 16 according to principles set forth herein. One or more blocks described herein may be performed by one or more elements of network node 16 such as by one or more of processing circuitry 68 (including the reconfiguration unit 32), processor 70, radio interface 62 and/or communication interface 60. Network node 16 such as via processing circuitry 68 and/or processor 70 and/or radio interface 62 and/or communication interface 60 is configured to detect a failure of a backhaul link in an integrated access backhaul network between the network node and the first parent network node of the network node (Block S134). The process further includes attempting to find an alternative backhaul link to replace the failed backhaul link (Block S136). If the attempt to find an alternative backhaul link fails (Block S138), then a first indication of an existence of the failure is communicated to the first child network node one level below the network node affected by the failure (Block S142) and the first child network node is caused to find another network node to serve as a new parent network node (Block S144). If the first child network node finds another node to serve as the new parent network node (Block S146), then the network node is configured to serve as a second child network node of the first child network node so that the first child network node serves as a parent of the network node (Block S148). If the attempt to find an alternative backhaul link succeeds, the alternative backhaul link is then utilized (Block S140).

Figure 28:
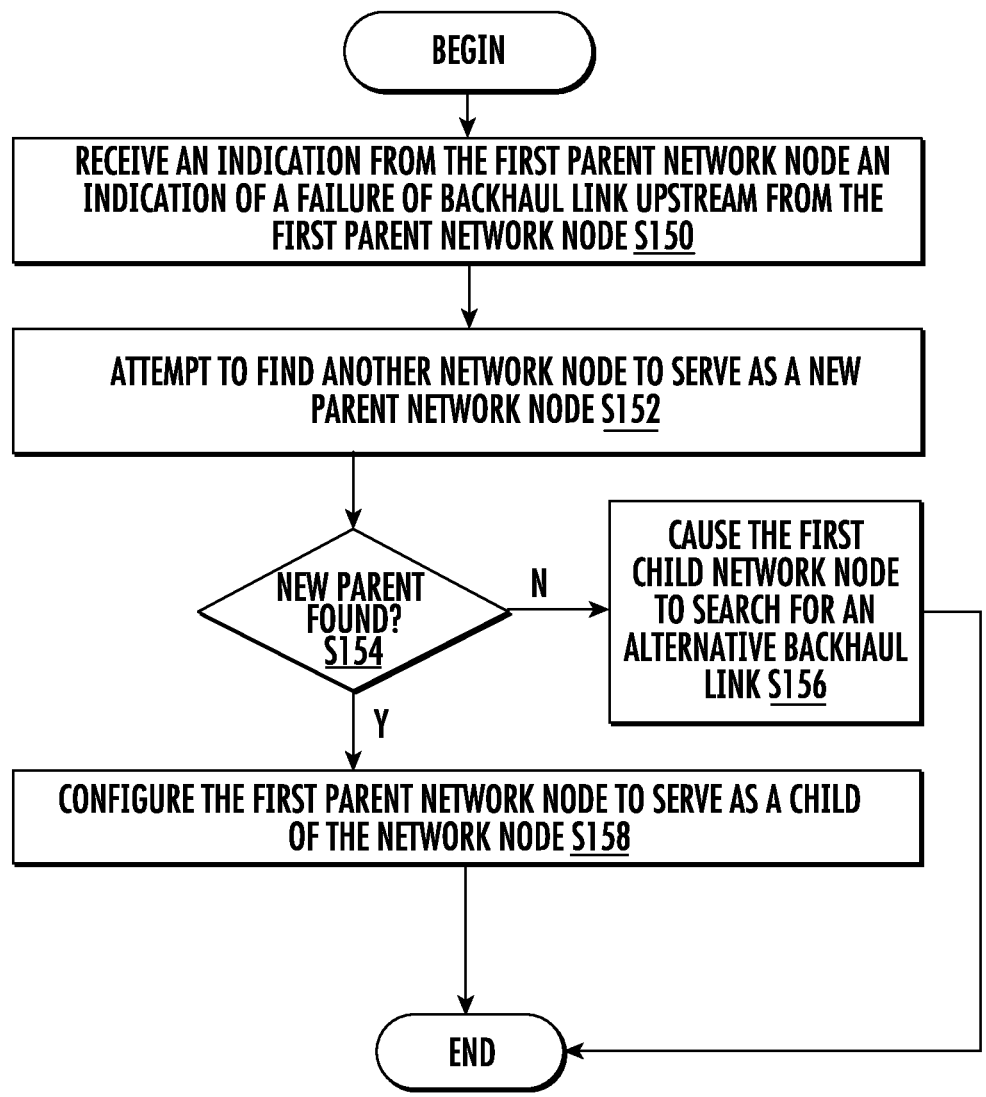
FIG. 28 is a flowchart of an exemplary process in a network node for failure recovery from the perspective a child node according to some embodiments of the present disclosure.

FIG. 28 is a flowchart of an exemplary process in a network node 16 for failure recovery from the perspective of a child node 16 according to principles set forth herein user equipment 6 according to some embodiments of the present. Network node 16 such as via processing circuitry 68 (including the reconfiguration unit 32), and/or processor 70 and/or radio interface 62 and/or communication interface 60 is configured to receive an indication from a first parent network node an indication of a failure of backhaul link upstream from the first parent network node (Block S150). The process includes attempting to find another network node to serve as a new parent network node (Block S152). If a new parent network node is found (Block S154), the first parent network node is configured to serve as a child of the network node (Block S158). If a new parent network node is not found, the first child network node is caused to search for an alternative backhaul link (Block S156).

Having described the general process flow of arrangements of the disclosure and having provided examples of hardware and software arrangements for implementing the processes and functions of the disclosure, the sections below provide details and examples of arrangements for efficient backhaul link failure recovery in Integrated Access Backhaul (TAB) networks.

In the embodiments described herein, a network node 16 is considered to be an TAB node 16 which may have parent nodes 16 which are also network nodes 16 and may have child nodes which may also be network nodes 16 and/or UEs 6. Also note that a donor TAB node may also have functionality as that described in reference to network node 16.

Hence, TAB nodes, child nodes, parent nodes and donor nodes are all referred to collectively herein as network nodes 16.

When an TAB node 16a, for example, (referred to herein as "first TAB node 16") detects some type of link failure towards its parent node, which could be network node 16b, for example. the radio link failure may cause the TAB node 16b to send a first indication (referred to as a primary indication) to other descendant nodes 16/UEs 6 to inform them of the failure. For clarity and ease of understanding, the various network nodes 16a, 16b, 16c, etc., may serve as parent and/or child network nodes or donor network nodes, and are referred to hereafter as network nodes 16.

Primary indications can be sent to, for example, all first level descendant IAB nodes 16 (i.e., IAB nodes 16 that have the first IAB node 16 as their parent) and/or all first level descendant UEs 6 (i.e., UEs that have the first IAB node 16 as their access IAB node). The indication can also be sent to a subset of the descendant IAB nodes 16 and/or a subset of the descendant UEs 6. This subset of nodes 16 and/or UEs to be informed could be based on one or a combination of several factors such as:

a. data transmission activity: for example, only those nodes 16 or UEs 6 that have data transmission or reception via the first IAB node 16 within a certain duration before the link failure was detected by the first node 16. The duration may be a network configurable parameter. The UL and DL data can be considered together or separately. For example, only UL data is considered, only DL data is considered, or both are considered together. Also, there may be a separate time duration parameter for UL and DL, etc.

b. traffic load: for example, only those nodes 16 or UEs 6 that have sent or received a certain volume of data within a certain duration before the link failure was detected by the first node. The data volume threshold and duration, for example, may be network configurable parameters. As before, UL and DL traffic load can be considered together or separately and there may be separate data volume and/or time duration parameters for UL and DL, etc.

c. IAB nodes 16 that are serving many IAB nodes 16 or/and UEs 6. This can be based on considering the first level descendant nodes 16 and/or UEs 6 of the IAB nodes 16, or all the descendant nodes 16/UEs 6 whose path to the donor is via the first IAB node 16. Here, a threshold could be specified, which can be based, for example, on the number of first level descendant IAB nodes 16 or UEs 6 that are to be affected, and optionally the second level descendant IAB nodes 16 or UEs 6 that are affected, etc. Also, a different weight could be placed on the IAB nodes 16 than a UE 6 (for example, an IAB node 16 can be counted as nxUE, where n is the average number of UEs 6 served per IAB node 16).

d. IAB nodes 16 that are serving heavy traffic. Like in c above, but here instead of the number of nodes 16/UEs 6, the traffic volume that was being passed through the IAB nodes 16 (in UL, DL, or both) or/and the traffic (UL, DL, or both) of the UEs 6 are considered.

e. IAB nodes 16 that are serving high priority data or/and services are informed. IAB nodes 16 may be aware of the quality of service (QoS) of the bearers that are being served by their child nodes 16 (or UEs 6) either implicitly (e.g., looking at adaptation header information of packets destined to the concerned IAB node 16, or that are routed via that IAB node 16) or the information can be configured explicitly by the IAB donor node 16 (e.g., the first IAB node 16 may be configured by the IAB donor node 16 to put first children X, Y, Z in its list of children that are serving high priority data).

Some signaling and mechanisms should be in place before some of the above selection mechanisms could be applied. For example, to enable a or b, IAB nodes 16 may keep the data transmission/reception history of their first level descendant IAB nodes 16 or UEs 6. As another example, to enable c, IAB nodes 16 may be informed when UEs 6 or other IAB nodes 16 start using one of their descendant nodes 16 as a parent or disconnect from them. This can be done just at a depth of one level (e.g., an IAB node 16 knows how many children nodes that each of its children has) or a greater depth (e.g., an IAB node 16 knows the number of each of its child node's child and grandchild nodes 16, etc.). This information can be communicated from child nodes 16 to their parent node 16 whenever a child node 16 or UE 6 connects or disconnects from the child node, or it can be communicated from the donor nodes 16 to the IAB node 16, as the donor node 16 may have an overview of the whole topology of the network.

The donor node 16 may communicate any topology change (e.g., a UE 6 connecting or disconnecting to an IAB node 16, an IAB node 16 connecting or disconnecting from another IAB node 16, etc.), either in a periodic fashion or every time such a change occurs, to all affected nodes 16. This can be raw detailed information (e.g., user x added to node y, node z added to node y, etc.), or can be just an update of a certain parameter (e.g., a child IAB node 16 informs its parent IAB node 16 that the number of IAB nodes 16 that are under it, where "under it" here refers to descendants at all levels, or it can be just a delta value from the previously communicated value, etc.).

Yet another example, to enable d, IAB nodes 16 may obtain information akin to a combination of the information used to enable a, b and c, where nodes 16 may inform their parent nodes 16 about the data transmission/reception rate/history of their children nodes 16/UEs 22. Alternatively, an IAB node 16 could implicitly determine or gather the data rate/history from looking at the destination/source IAB node addresses in the adaptation headers of the UL/DL packets that are passing through it.

Finally, to enable e, the IAB nodes 16 can use the bearer mapping and QoS information in the Adaptation layer configured by the IAB-donor node 16. More details about Adaptation layer functions and bearer mapping configuration can be found in the Third Generation Partnership Project Technical Report (TR) 38.874.

These primary indications may have the result that the transmissions of the nodes 16 and UEs 6 receiving such an indication are to be modified. For example, the transmissions may be halted, or the transmission rate of DL/UL data may be reduced. In other words, receiving such an indication may result in some of the packet data convergence protocol (PDCP), radio link control (RLC), and medium access control (MAC) processes being halted or limited. The behavior could be the same for UEs 6 and IAB nodes 16, or it could be only the IAB nodes 16 or only the UEs 6 that will be affected. Also, the indication may warn (e.g., via a flag included in the indication message) the IAB nodes 16 or UEs to start searching for alternative parent nodes 16 to reconnect with the IAB-donor node 16. For example, this could be done by modifying some parameters like cell level offsets so that neighbor cells which are of less signal quality than a current serving cell can end up being chosen as the candidate serving cells.

It should be noted that the indications sent out to the child nodes 16 do not necessarily have to be the same (e.g., some of the first child IAB nodes 16 can get this indication with a flag to start searching, while some other children may not).

The primary indications may be sent to the child nodes either via dedicated or broadcasted signaling. The dedicated signaling can be done in different ways (e.g., a new MAC control element (CE), PDCP control packet data unit (PDU), etc.), while the broadcast can be done via one of the system information blocks (SIBs).

In some of the above embodiments, the indications were passed by just one level (i.e., from the first IAB node 16 to all or a subset of its immediate children nodes 16/UEs 22). Similarly, this indication may be further transmitted to other child nodes 16/UEs 6 (referred to as secondary indications herein) in the chain until it reaches the leaf nodes/UEs 6 (or until a network configurable depth from the first node). A flag or information element (IE) can be included in the indication to signify that the indication is a secondary indication. In one alternative, this is just a Boolean value that takes a TRUE value if the indication is a secondary indication and a FALSE value if it is a primary indication (the reverse values can also be used). In another alternative, this flag/IE could be an integer value (e.g., 0 means primary indication, 1 or more means secondary indication, where 1 signifies the indication is from a grandparent node, 2 signifies the indication is from a great-grandparent node, etc.) A node 16/UE 6 may respond the same way on the reception of a primary indication and a secondary indication (i.e., transmission stopped or reduced, start searching for alternate parents, etc.) or it could behave differently. For example, a node 16 may stop transmission on the reception of a primary indication, but just reduce the transmission if the indication is a secondary one (the reduction level, for example, depending on the depth of the indication). For example, a grandparent's indication may lead to a reduction of x %, a great-grand parent's indication leads to a reduction by 0.5x %, etc.). In another example, a network node 16 may start searching for alternative parent nodes 16 on the reception of primary indications but not on the reception of secondary indications. Just like the primary indications, the secondary indications could also have an additional flag indicating whether to just pause/reduce UL transmission or to start searching for alternate parent nodes 16.

Figure 29:
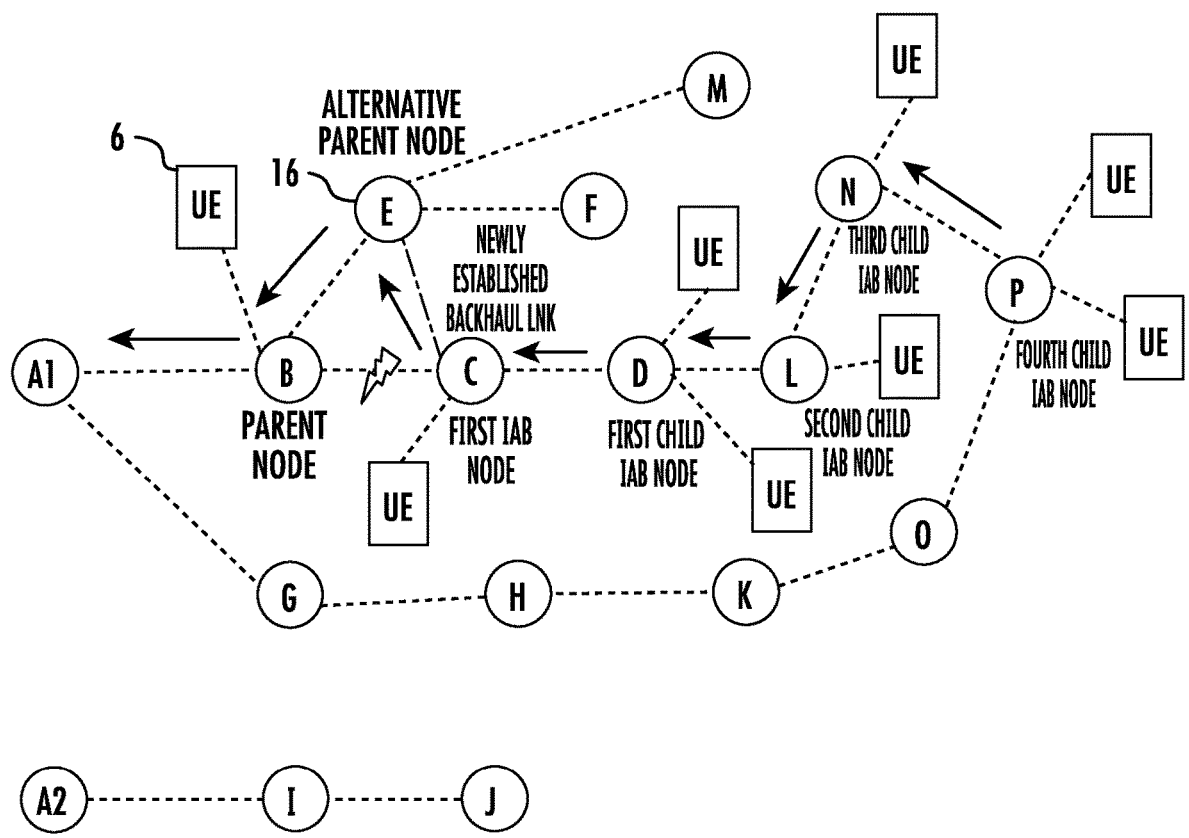
FIGS. 29-34 illustrate example failure recovery scenarios according to principles of the present disclosure.

In FIGS. 29-34, which are discussed below, the UEs 6 are shown as rectangles and the network nodes 16 are shown as ellipses. Some of the network nodes 16 serve as a parent node, a child node or both. Referring now to FIG. 29, to start the recovery process, the first IAB node C 16 will search for an alternative parent node E 16 to establish a new backhaul link. In some cases, the first IAB node C 16 establishes a new backhaul link from C to E, as shown in FIG. 29, and the affected descendant/child IAB nodes 16/UEs 6 are informed (either implicitly or explicitly) to resume normal operation, ending in a successful termination of the backhaul link failure recovery process. Implicit indication could be the reception of an UL scheduling grant for a pending UL data schedule request (e.g., a scheduling request (SR)/buffer status report (BSR) sent before the link failure). Explicit information could be the sending of a backhaul link recovery message. This can be a new message, or it can be a modified primary/secondary indication message that contains an additional flag indicating that the backhaul link has recovered.

As discussed above, the primary and secondary indications can be sent to the child nodes 16 with a flag causing the receiving node to start looking for an alternate parent. This could be done immediately with failure detection. In other words, the child node can search for alternate parents while the first IAB node 16 is also searching for alternative parents. Or the indication is sent to the children only if the first IAB node 16 fails to find an alternate path. For example, the primary indication may be sent to the children with a no "search for alternate parents" flag set, and when the first IAB node 16 fails to find a new parent, a new primary indication may be sent to the children with the "search for alternate parents" flag on. In some cases, the primary indication with the flag set on can be sent to some of the children even if the first IAB node 16 has found an alternative parent. For example, the first IAB node 16 may find an alternative parent node 16 and may establish a new backhaul link, but the newly established backhaul link may not be good enough to support the data for all the affected child IAB nodes 16/UEs 22. In this case, the primary indication with the flag set on can be sent to some or all of the children.

When receiving an indication that contains a search for alternative parents, the IAB node 16 may behave in a way similar to its detecting a radio link failure with its parent node 16 (i.e., even though the link to the parent could be in excellent conditions and may still be the best link among all others possible parents). If very recent measurements are available, then the next best neighbor node 16 in that measurement may be chosen as the new parent.

Figure 30:
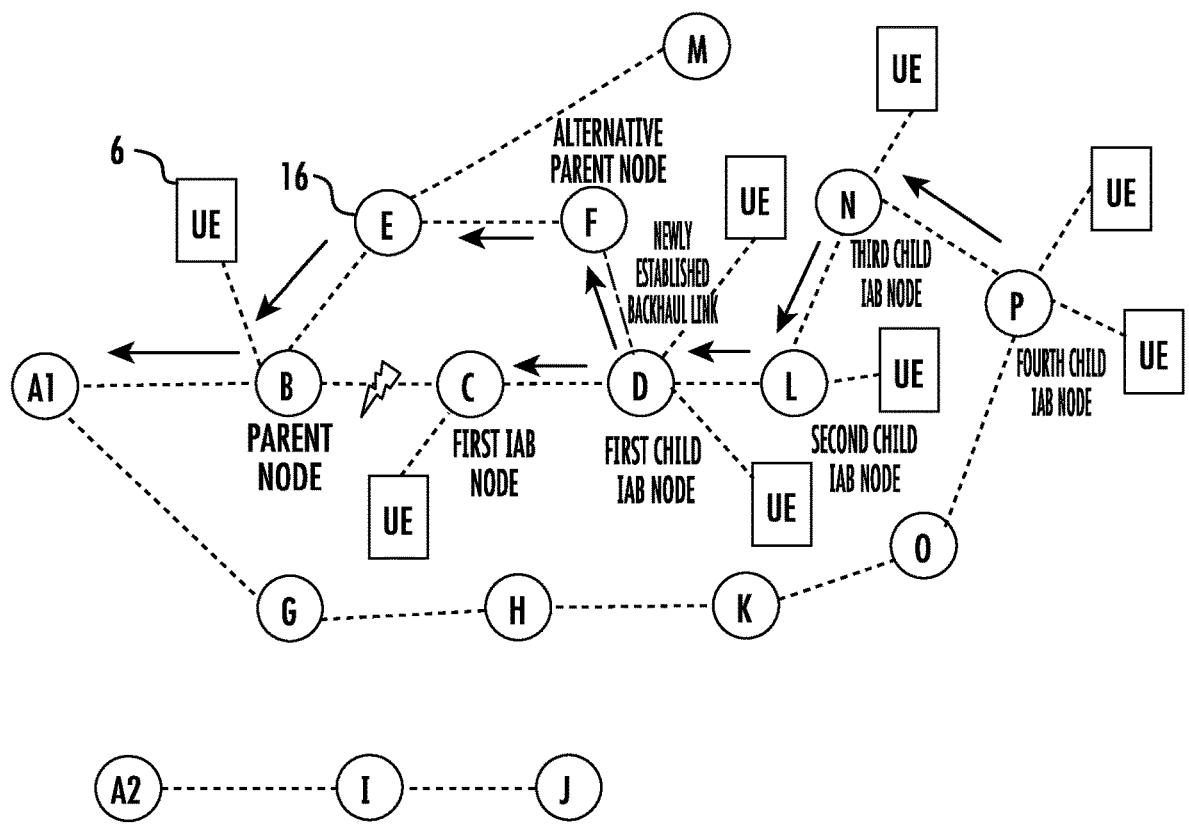
Figure 31:
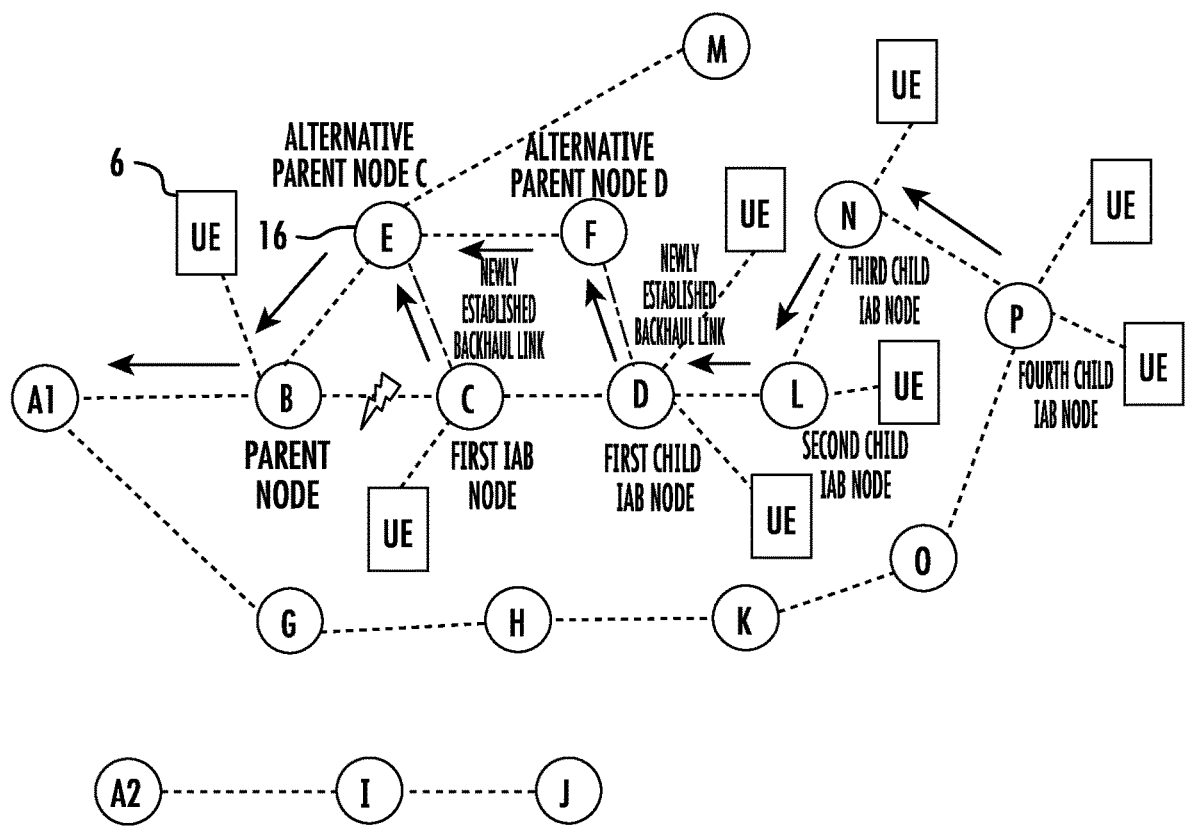

When the IAB node 16 finds an alternative parent, the IAB node 16 may inform the old parent about it (e.g., using a MAC CE, PDCP control PDU, etc.), referred to herein as a response indication. The old parent can then reconnect to the former child node as a parent (e.g., as shown in FIG. 30, where node D informs node C of the new parent F so that node D becomes a new child of node C). In some cases, the old parent may already have found another parent (e.g., if the parent node 16 sent the indication with the search flag on immediately when it detected a backhaul link failure and both the old parent and child were searching for alternate parents at the same time). In this case, the old parent may ignore the response indication and not act on it and the network topology could end up like that shown in FIG. 31, where node C becomes a direct child of node E, rather than of node D.

If a child IAB node 16 doesn't find an alternative parent, it could also inform the old parent about it (e.g., by having a flag that is set to FALSE in the response indication). In the primary/secondary indications, some additional information can be included for the child node 16 to decide when to give up searching for an alternative parent. For example, a timer value can be included, which indicates how long the child node 16 should strive to find an alternative parent before giving up. Another item of information could be a minimum signal quality level that is acceptable for a parent node 16. Note that instead of communicating these parameters in the indications, the values of these parameters could be specified in the standards or communicated and configured by the network during IAB node 16 setup or by a parent node 16 when a node connects to the IAB node 16 as a child.

Figure 32:
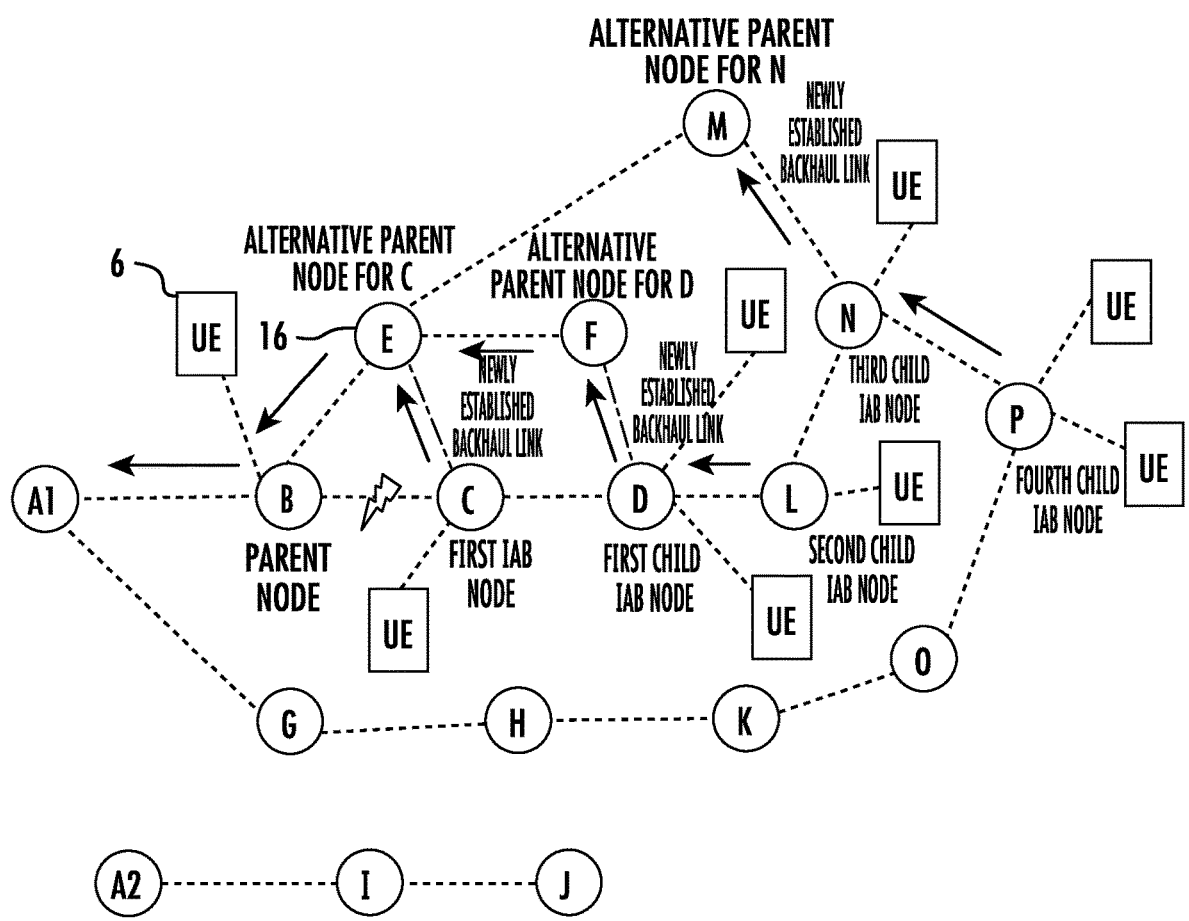

In some situations, a new connection to one or two alternative parents (as in FIG. 30 or FIG. 31) might not provide the resources required to fully recover from RLF due to low signal quality or link congestion. In such a case, the chain of affected IAB nodes 16 could be split into several subsets/clusters of IAB nodes 16 each reconnected to a new parent as shown in FIG. 32. For instance, once a child IAB node D 16 finds an alternative parent (node F) with link quality not good enough to support all its descendant nodes' data, then the child IAB node D 16 will calculate or estimate the set of descendant IAB nodes 16 that it can support via this new link and provide a list of those (descendant IAB nodes 16) that are not supported. The child IAB node may inform the first descendant IAB node 16 in the list of not-supported nodes 16 to search for an alternative parent node 16, which descendant IAB node 16 will repeat the same process performed by the child IAB, and so on.

It should be noted that nodes 16 that have multiple parents can behave in a different way when receiving the primary/secondary indication. For example, they may not resort to searching for yet another parent and instead can immediately send a positive response indication to the old parent and also re-route the UEs/bearers that were using the old path via the existing alternate path.

If the indication was sent to several children, then the IAB node 16 may act on the first positive response indication and ignore the rest. Upon getting the first positive response, it could also send a new indication to the other child nodes 16 to stop searching for an alternate parent and/or resume normal operations. This indication to stop searching for an alternate parent could also be sent even if no positive response was received from a child node (e.g., when the parent node 16 was also searching for an alternate parent at the same time and found it before the child nodes 16, the backhaul link problem was due to some temporary blockage and was resolved, etc.).

Figure 33:
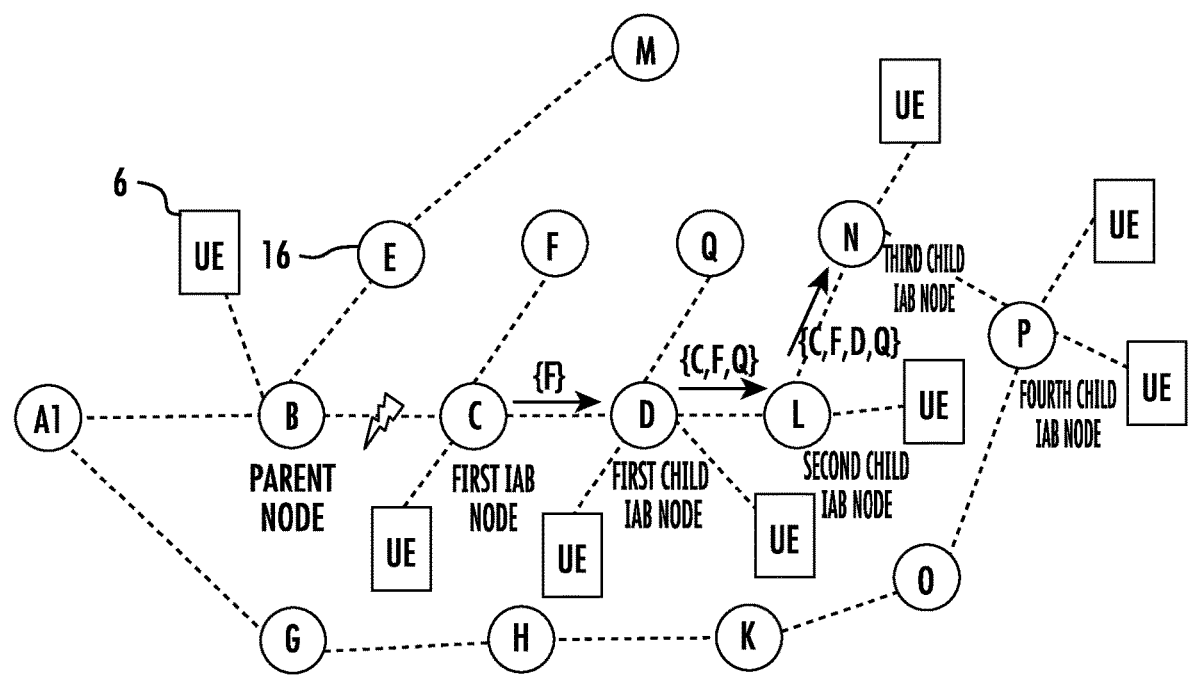
Figure 34:
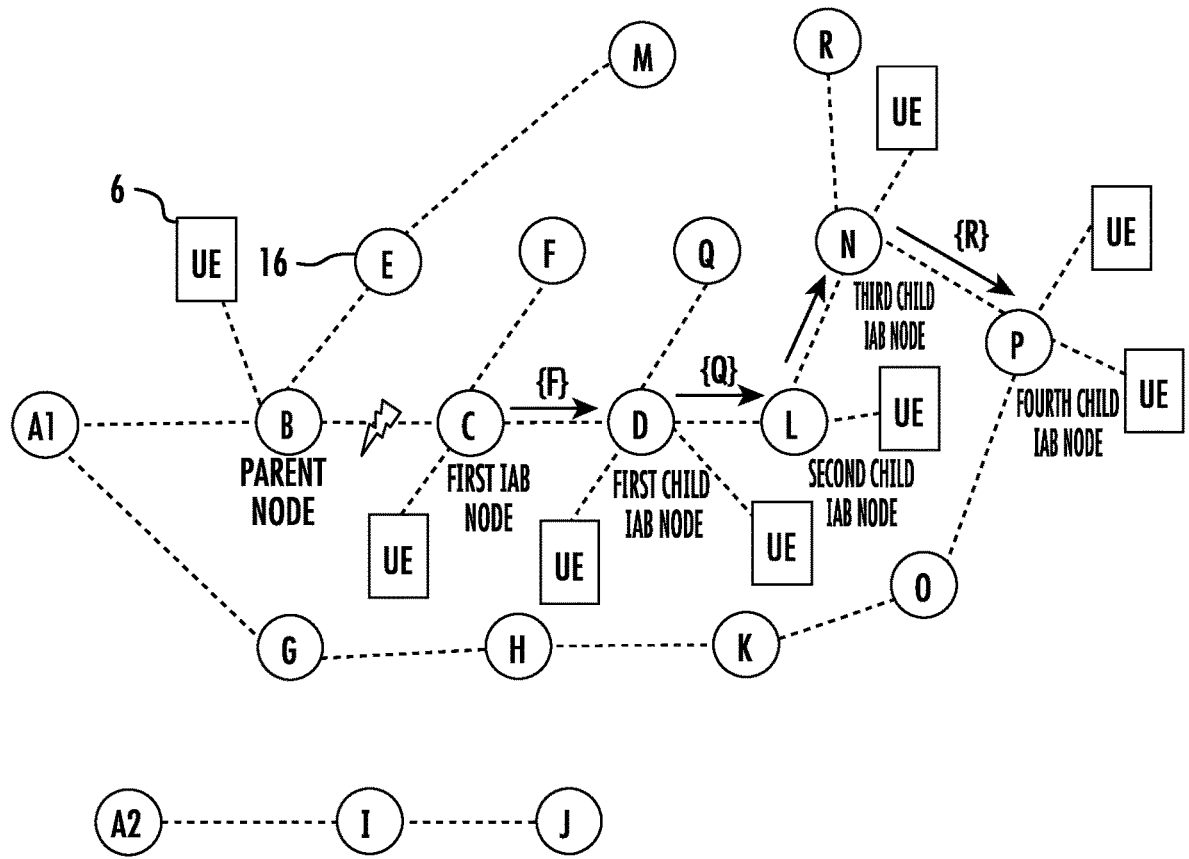

The indication to search for alternate parents can contain additional information such as a list of upstream nodes 16 that cannot serve as alternative parent nodes 16. In one alternative, the list could be a list of child nodes 16 at the same level as the node receiving the indication (so as to prevent a loop that leads back to the old parent). For example, as illustrated in FIG. 33, IAB node D may receive an indication with a list containing node F (where F is another node which was also a first level child of parent node C). Similarly, an indication sent to F could contain D in the list. Having such a list will prevent creating a loop that leads back to the old parent (i.e., to avoid ending up with C connecting to D connecting to F connecting to C). The list may be updated as the indication propagates down the hierarchy of the affected IAB nodes 16. This is illustrated in FIG. 33, where the list sent to node D contains node F, and the list is updated to include node C and node Q when node D sends an indication to node L, and so on. In another alternative, the list is not propagated and each node sending the indication will create a new list disregarding the list it has received, as illustrated in FIG. 34.

It should be noted that the list of node identifiers communicated in the indications described above could be a physical cell identity (PCI), an eNB/gNB identity, a CGI (Cell Global Identity) which contains both the cell and eNB/gNB identity, etc.

In some cases, the IAB node 16 may not include the list of children of the parent in the indication as described above. Instead, the child node simply tries to connect to the best alternative parent, and if the candidate parent node 16 was also in the same process (i.e., also looking for a parent), the child node will not admit that request. Yet another option could be to indicate in the connection request that this connection request was due to an indication from a parent node 16 to change to another parent (and potentially include an identifier of the old parent). If the candidate node 16 was also a child node of the old parent, it may not admit the connection request.

If none of the first level child IAB nodes 16 are able to find an alternate parent and they have not received any indication to stop the search from the parent node 16, then the first level child node 16 could delegate the task (finding an alternative parent for establishing connectivity with IAB-donor) to its child node, and so on. The recovery process will stop either after a successful recovery from backhaul failure or after the leaf nodes in the hierarchy of affected IAB nodes 16 failed to find an alternative parent node 16 for recovery from backhaul failure. For the latter case, it is not possible to reconnect all or some of the affected IAB nodes 16/UEs 6 with their prior IAB-donor node 16, and these nodes will then establish connections with alternative IAB-donor nodes 16, such as A2 in example figures.

In some cases, there can be multiple paths setup for an IAB node 16 (for redundancy, load balancing, etc.). In such cases, the failure of a backhaul link may affect only one path and thus the other paths can be used to reroute traffic/data for the affected child IAB nodes 16/UEs 22. In case the first IAB node 16 does not have multiple paths but its children nodes 16 have, then it will notify the very first node (in the hierarchy of affected IAB nodes 16) having multiple paths. That node 16 can use the other paths to reroute traffic/data for all the affected IAB nodes 16/UEs 6 including the first IAB node 16 or for a subset of affected IAB nodes 16/UEs 22, depending on the situation Example Alternative Embodiment a (Establish a Connection Based on Pre-Configuration of Good Candidate Nodes 16)

In this alternative embodiment, each node may be assigned a priority value indicating how likely the node is to be able to find an alternative path in case of a link failure affecting multiple nodes 16. The value could be assigned based on measurements of possible candidate parent nodes 16, which measurements all nodes 16 can perform on a regular basis prior to any link failure occurring. Knowledge about the values of other nodes 16 could be propagated to all nodes 16 in the same cluster. In case link failure occurs, the node 16 (or nodes 16) with the highest value or likelihood to find an alternative path will initiate a search for such a path. Other nodes 16 belonging to the same cluster could continue to serve end users as normal. As a possible optimization, traffic belonging to the other nodes may be re-routed towards nodes 16 with the high likelihood of establishing alternative paths. Once a node has found an alternative path it can inform other nodes 16 about this and traffic can be re-routed according to the new path.

Example Alternative Embodiment B (Establish a Connection in Parallel, without Disturbing Ongoing Traffic)

In an alternative embodiment, several or all nodes 16 could start to search for alternative paths, while still supporting ongoing traffic along the old path. Once a node 16 has found an alternative path it could, in any order, inform other nodes 16 about this and establish a connection along this alternative path. In this way, new paths can be established quickly, while the old path could still be maintained minimizing the changes once a new path is found.

A systemic/hierarchical approach for link failure recovery in an IAB (relay) network for scenarios where a backhaul link failure leaves several IAB nodes 16 as well as UEs disconnected from the IAB-donor are disclosed. This recovery approach overcomes a low likelihood that the directly affected IAB node 16 (first IAB node 16) will find an alternative parent node 16 for reconnection to IAB-donor and fully recover from link failure. The proposed hierarchical approach solves the long service interruption and heavy signaling load problems that could be faced by conventional approaches to reorganize the tree structure of the network after a link failure.

Depending on the post-failure IAB network situation, the recovery mechanism will reorganize the network to restore normal operation via one of the following approaches:

the first IAB node 16 establishes a new connection with an alternative parent node 16 to reroute the traffic for all the affected IAB nodes 16 and UEs 6;

the first IAB node 16 and/or one or more child nodes 16 establish new connections with alternative parent nodes 16, where each newly established connection reroutes traffic for a subset of affected IAB nodes 16 and UEs 6; or one or more child nodes 16 establish new connections with alternative parent nodes 16 where one of the child nodes 16 now serves as a new parent for the first IAB node 16. Each newly established connection reroutes traffic for a subset of affected IAB nodes 16 and UEs 6.

Thus, according to some aspects, a network node 16 is configured to communicate with a first parent network node 16 and a first child network node 16. The network node 16 is configured to detect a failure of a backhaul link in an integrated access backhaul network between the network node 16 and the first parent network node 16 of the network node 16. The network node 16 is configured to attempt to find an alternative backhaul link to replace the failed backhaul link. If the attempt to find an alternative backhaul link fails, then the network node 16 communicates a first indication of an existence of the failure to the first child network node 16 one level below the network node 16 affected by the failure and causes the first child network node 16 to find another network node 16 to serve as a new parent network node 16. If the first child network node 16 finds another node 16 to serve as the new parent network node 16 then the network node 16 is configured to serve as a second child network node 16 of the first child network node 16 so that the first child network node 16 serves as a parent of the network node 16. If the attempt to find an alternative backhaul link succeeds, then the network node 16 utilizes the alternative backhaul link.

According to this aspect, in some embodiments, if no child network node 16 one level below the network node 16 finds a new parent network node 16, then configure a third child network node 16 one level below the first child network node 16 to search for another network node 16 to serve as the new parent network node 16. In some embodiments, when the first child network node 16 finds another node 16 to serve as the new parent network node 16, the network node 16 causes all child network node 16s below a level of the first child network node 16 to resume operation.

According to another aspect, a method implemented in a network node 16 in communication with a first parent network node 16 and a first child network node 16. The method includes receiving an indication from the first parent network node 16 an indication of a failure of backhaul link upstream from the first parent network node 16. The method also includes attempting to find another network node 16 to serve as a new parent network node 16. If a new parent network node 16 is found, then the method includes configuring the first parent network node 16 to serve as a child of the network node 16. If a new parent network node 16 is not found, then the method includes causing the first child network node 16 to search for an alternative backhaul link.

According to one aspect, a network node 16 configured to communicate with a first parent network node 16 and a first child network node 16 is provided. The network node 16 includes processing circuitry 68 configured to detect a failure of a backhaul link in an integrated access backhaul, IAB, network between the network node 16 and the first parent network node 16 of the network node 16. The processing circuitry 68 is further configured to attempt to find an alternative backhaul link to replace the failed backhaul link. If the attempt to find an alternative backhaul link fails, then the processing circuitry 68 is configured to communicate a first indication of an existence of the failure to the first child network node 16 one level below the network node 16 affected by the failure, and cause the first child network node 16 to find another network node 16 to serve as a new parent network node 16. If the attempt to find an alternative backhaul link succeeds, then the processing circuitry 68 is configured to utilize the alternative backhaul link.

According to this aspect, in some embodiments, when the first child network node 16 finds another node to serve as the new parent network node 16, the network node 16 is configured to serve as a second child network node 16 of the first child network node 16 so that the first child network node 16 serves as a parent of the network node 16. In some embodiments, when no child network node 16 one level below the network node 16 finds a new parent network node 16, a third child network node 16 one level below the first child network node 16 is configured to search for another network node 16 to serve as the new parent network node 16. In some embodiments, when the first child network node 16 finds another node to serve as the new parent network node 16, all child network nodes 16 or 6 below a level of the first child network node 16 are caused to resume operation. In some embodiments, the first child network node 16 is a wireless device. In some embodiments, the processing circuitry 68 is further configured to forward the first indication to a subset of less than all child network nodes below a level of the network node 16. In some embodiments, the network nodes in the subset are selected based at least in part on whether data transmission or reception by the network node 16 occurs within a time duration of when the first indication is received. In some embodiments, the network nodes in the subset are selected based at least in part on whether a volume of data transmitted or received by the network node 16 within a time duration of when the first indication is received. In some embodiments, the network nodes in the subset are selected based at least in part on whether a child network node 16 would be affected by the failure. In some embodiments, the network nodes in the subset are selected based at least in part on a priority of data to be transmitted or received by the network node 16. In some embodiments, the network nodes in the subset are selected based at least in part on a quality of service provided by the first child network node 16.

According to another aspect, a method implemented in a network node 16 having a first parent network node 16 and a first child network node 16 is provided. The method includes detecting, via the processing circuitry 68, a failure of a backhaul link in an integrated access backhaul, IAB, network between the network node 16 and the first parent network node 16 of the network node 16. The method also includes attempting to find an alternative backhaul link to replace the failed backhaul link. If the attempt to find an alternative backhaul link fails, then the method includes communicating, via the processing circuitry 68 and or radio interface 62, a first indication of an existence of the failure to the first child network node 16 one level below the network node 16 affected by the failure and causing the first child network node 16 to find another network node 16 to serve as a new parent network node 16. The method further includes, if the attempt to find an alternative backhaul link succeeds, then utilizing the alternative backhaul link.

According to this aspect, in some embodiments, when the first child network node 16 finds another node to serve as the new parent network node 16, the network node 16 serves as a second child network node 16 of the first child network node 16 so that the first child network node 16 serves as a parent of the network node 16. In some embodiments, when no child network node 16 one level below the network node 16 finds a new parent network node 16, then a third child network node 16 one level below the first child network node 16 searches for another network node 16 to serve as the new parent network node 16. In some embodiments, when the first child network node 16 finds another node to serve as the new parent network node 16, all child network nodes below a level of the first child network node 16 resume operation. In some embodiments, the method further includes forwarding the first indication to a subset of less than all child network nodes below a level of the network node 16. In some embodiments, the network nodes in the subset are selected based at least in part on whether data transmission or reception by the network node 16 occurs within a time duration of when the first indication is received. In some embodiments, the network nodes in the subset are selected based at least in part on whether a volume of data transmitted or received by the network node 16 within a time duration of when the first indication is received. In some embodiments, the network nodes in the subset are selected based at least in part on whether a child network node 16 would be affected by the failure. In some embodiments, the network nodes in the subset are selected based at least in part on a priority of data to be transmitted or received by the network node 16. In some embodiments, the network nodes in the subset are selected based at least in part on a quality of service provided by the first child network node 16.

According to another aspect, a network node 16 is configured to communicate with a first parent network node 16 and a first child network node 16. The network node 16 includes processing circuitry 68 configured to receive from the first parent network node 16 an indication of a failure of a backhaul link upstream from the first parent network node 16, and attempt to find another network node 16 to serve as a new parent network node 16. If a new parent network node 16 is found, then the processing circuitry 68 is configured to configure the first parent network node 16 to serve as a child of the network node 16. If a new parent network node 16 is not found, then the processing circuitry is 68 configured to cause the first child network node 16 to search for an alternative backhaul link.

According to yet another aspect, a method implemented in a network node 16 in communication with a first parent network node 16 and a first child network node 16 is provided. The method includes receiving from the first parent network node 16 an indication of a failure of a backhaul link upstream from the first parent network node 16, and attempting to find another network node 16 to serve as a new parent network node 16. If a new parent network node 16 is found, then the method includes configuring, via the processing circuitry 68, the first parent network node 16 to serve as a child of the network node 16. If a new parent network node 16 is not found, then the method includes causing the first child network node 16 to search for an alternative backhaul link.

Some embodiments include the following:

Embodiment A1. A network node configured to communicate with a first parent network node and a first child network node, the network node configured to, and/or comprising a radio interface and/or comprising processing circuitry configured to:
 detect a failure of a backhaul link in an integrated access backhaul network between the network node and the first parent network node of the network node;
 attempt to find an alternative backhaul link to replace the failed backhaul link;
 if the attempt to find an alternative backhaul link fails, then:
  communicate a first indication of an existence of the failure to the first child network node one level below the network node affected by the failure;
  cause the first child network node to find another network node to serve as a new parent network node; and
  if the first child network node finds another node to serve as the new parent network node, then configure the network node to serve as a second child network node of the first child network node so that the first child network node serves as a parent of the network node; and
 if the attempt to find an alternative backhaul link succeeds, then utilize the alternative backhaul link.

Embodiment A2. The network node of Embodiment A1, wherein, if no child network node one level below the network node finds a new parent network node, then configure a third child network node one level below the first child network node to search for another network node to serve as the new parent network node.

Embodiment A3. The network node of Embodiment A1, wherein, when the first child network node finds another node to serve as the new parent network node, then cause all child network nodes below a level of the first child network node to resume operation.

Embodiment B1. A method implemented in a network node having a first parent network node and a first child network node, the method comprising:
 detecting a failure of a backhaul link in an integrated access backhaul network between the network node and the first parent network node of the network node;
 attempting to find an alternative backhaul link to replace the failed backhaul link;
 if the attempt to find an alternative backhaul link fails, then:
  communicating a first indication of an existence of the failure to the first child network node one level below the network node affected by the failure;
  cause the first child network node to find another network node to serve as a new parent network node; and
  if the first child network node finds another node to serve as a new parent network node, then configuring the network node to serve as a second child network node of the first child network node so that the first child network node serves as a parent of the network node; and
 if the attempt to find an alternative backhaul link succeeds, then utilize the alternative backhaul link.

Embodiment B2. The network node of Embodiment B1, wherein, if no child network node one level below the network node finds a new parent network node, then configuring a third child network node one level below the first child network node to search for another network node to serve as the new parent network node.

Embodiment B3. The network node of Embodiment B1, wherein, when the first child network node finds another node to serve as the new parent network node, then causing all child network nodes below a level of the first child network node to resume operation.

Embodiment C1. A network node configured to communicate with a first parent network node and a first child network node, the network node configured to, and/or comprising a radio interface and/or processing circuitry configured to:

receive an indication from the first parent network node an indication of a failure of backhaul link upstream from the first parent network node;

attempt to find another network node to serve as a new parent network node;

if a new parent network node is found, then:
configure the first parent network node to serve as a child of the network node; and
if a new parent network node is not found, then:
cause the first child network node to search for an alternative backhaul link.

Embodiment D1. A method implemented in a network node in communication with a first parent network node and a first child network node, the method comprising:

receiving an indication from the first parent network node an indication of a failure of backhaul link upstream from the first parent network node;

attempting to find another network node to serve as a new parent network node;

if a new parent network node is found, then:
configuring the first parent network node to serve as a child of the network node; and
if a new parent network node is not found, then:
causing the first child network node to search for an alternative backhaul link.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices. Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

| Abbreviation | Explanation |
| --- | --- |
| 3GPP | 3rd Generation Partnership Project |
| ACK | Acknowledgement |
| BSR | Buffer Status Report |
| CN | Core Network |
| CP | Control Plane |
| CU | Central Unit |

-continued

| Abbreviation | Explanation |
|---|---|
| DL | Downlink |
| DU | Distributed Unit |
| IAB | Integrated Access Backhaul |
| MAC | Medium Access Control |
| NACK | Negative ACK |
| PDCP | Packet Data Convergence Protocol |
| PDU | Protocol Data Unit |
| RLC | Radio Link Control |
| RRC | Radio Resource Control |
| SDU | Service Data Unit |
| SIB | System Information Block |
| SR | Scheduling Request |
| UP | User Plane |
| UE | User Equipment |
| UL | Uplink |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network node configured to communicate with a first parent network node, the network node including processing circuitry configured to:
   detect a failure of a backhaul link in an integrated access backhaul, IAB, network between the network node and the first parent network node of the network node;
   attempt to find an alternative backhaul link to replace the failed backhaul link;
   if the attempt to find the alternative backhaul link fails, then:
      cause a first child network node one level below the first parent network node to attempt to find a second network node to serve as a new parent network node for the alternative backhaul link;
      if the first child network node one level below the first parent network node fails to find another network node to serve as the new parent network node, cause a third child network node one level below the first child network node to attempt to find another network node to serve as the new parent network node; and
   if the attempt to find the alternative backhaul link succeeds then utilize the alternative backhaul link.

2. The network node of claim 1, wherein, when the first child network node finds another node to serve as the new parent network node, the network node is configured to serve as a second child network node of the first child network node so that the first child network node serves as a parent of the network node.

3. The network node of claim 1, wherein, when the first child network node finds another node to serve as the new parent network node, all child network nodes below a level of the first child network node are caused to resume operation.

4. The network node of claim 1, wherein the processing circuitry is further configured to forward the first indication to a subset of less than all child network nodes below a level of the network node.

5. The network node of claim 4, wherein the network nodes in the subset are selected based at least in part on whether one of data transmission and reception by the network node occurs within a time duration of when the first indication is received.

6. The network node of claim 4, wherein the network nodes in the subset are selected based at least in part on whether a volume of data one of transmitted and received by the network node within a time duration of when the first indication is received.

7. The network node of claim 4, wherein the network nodes in the subset are selected based at least in part on whether a child network node would be affected by the failure.

8. The network node of claim 4, wherein the network nodes in the subset are selected based at least in part on a quality of service provided by the first child network node.

9. A method implemented in a network node having a first parent network node, the method comprising:
   detecting a failure of a backhaul link in an integrated access backhaul, IAB, network between the network node and the first parent network node of the network node;
   attempting to find an alternative backhaul link to replace the failed backhaul link;
   if the attempt to find the alternative backhaul link fails, then:
      cause a first child network node one level below the first parent network node to attempt to find a second network node to serve as a new parent network node for the alternative backhaul link;
      if the first child network node one level below the first parent network node fails to find another network node to serve as the new parent network node, cause a third child network node one level below the first child network node to attempt to find another network node to serve as the new parent network node; and
   if the attempt to find an alternative backhaul link succeeds, then utilizing the alternative backhaul link.

10. The method of claim 9, wherein, when the first child network node finds another node to serve as the new parent network node, the network node serves as a second child network node of the first child network node so that the first child network node serves as a parent of the network node.

11. The method of claim 9, wherein, when the first child network node finds another node to serve as the new parent network node, all child network nodes below a level of the first child network node resume operation.

12. The method of claim 9, further comprising forwarding the first indication to a subset of less than all child network nodes below a level of the network node.

13. The method of claim 12, wherein the network nodes in the subset are selected based at least in part on whether one of data transmission and reception by the network node occurs within a time duration of when the first indication is received.

14. The method of claim 12, wherein the network nodes in the subset are selected based at least in part on whether a volume of data one of transmitted and received by the network node within a time duration of when the first indication is received.

15. The method of claim 12, wherein the network nodes in the subset are selected based at least in part on whether a child network node would be affected by the failure.

16. The method of claim 12, wherein the network nodes in the subset are selected based at least in part on a priority of data to be one of transmitted and received by the network node.

17. A network node configured to communicate with a first parent network node, the network node including processing circuitry configured to:
- receive from the first parent network node an indication of a failure of a backhaul link upstream from the first parent network node;
- attempt to find another network node to serve as a new parent network node;
- if the new parent network node is found, then:
  - configure the first parent network node to serve as a child of the network node; and
- if the new parent network node is not found, then:
  - cause a first child network node one level below the first parent network node to attempt to find a second network node to serve as the new parent network node for the alternative backhaul link;
  - if the first child network node one level below the first parent network node fails to find another network node to serve as the new parent network node, cause a third child network node one level below the first child network node to attempt to find another network node to serve as the new parent network node.

18. A method implemented in a network node in communication with a first parent network node, the method comprising:
- receiving from the first parent network node an indication of a failure of a backhaul link upstream from the first parent network node;
- attempting to find another network node to serve as a new parent network node;
- if the new parent network node is found, then:
  - configuring the first parent network node to serve as a child of the network node; and
- if the new parent network node is not found, then:
  - cause a first child network node one level below the first parent network node to attempt to find a second network node to serve as the new parent network node for the alternative backhaul link;
  - if the first child network node one level below the first parent network node fails to find another network node to serve as the new parent network node, cause a third child network node one level below the first child network node to attempt to find another network node to serve as the new parent network node.

* * * * *